(12) United States Patent
Correia et al.

(10) Patent No.: US 11,034,345 B2
(45) Date of Patent: Jun. 15, 2021

(54) SYSTEMS AND METHODS FOR VEHICLE OPERATION

(71) Applicant: Ford Global Technologies, LLC, Dearborn, MI (US)

(72) Inventors: Eduardo Correia, Laindon (GB); Vicki Noonan, Hutton (GB); Brian Rutter, Hindon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/263,983

(22) Filed: Jan. 31, 2019

(65) Prior Publication Data

US 2019/0248360 A1 Aug. 15, 2019

(30) Foreign Application Priority Data

Feb. 9, 2018 (GB) .................................. 1802134.5

(51) Int. Cl.
*B60W 20/16* (2016.01)
*F02D 45/00* (2006.01)
(Continued)

(52) U.S. Cl.
CPC ............ *B60W 20/16* (2016.01); *B60W 40/04* (2013.01); *B60W 2555/60* (2020.02);
(Continued)

(58) Field of Classification Search
CPC .... B60W 20/16; B60W 30/165; B60W 30/18; B60W 30/08; F02D 45/00; F02D 41/02;
(Continued)

(56) References Cited

U.S. PATENT DOCUMENTS 6,161,518 A * 12/2000 Nakakita ............. F02B 23/0696
123/298
8,352,150 B2 1/2013 Hijikata
(Continued)

FOREIGN PATENT DOCUMENTS

CN 101191425 A * 6/2008 ............. F01D 17/16
DE 4306381 A1 11/1993
(Continued)

OTHER PUBLICATIONS

Great Britain Intellectual Property Office, Combined Search and Examination Report under Sections 17 and 18(3) Issued in Application No. GB1802134.5, dated Aug. 10, 2018, 7 pages.

*Primary Examiner* — Yuri Kan
(74) *Attorney, Agent, or Firm* — Geoffrey Brumbaugh; McCoy Russell LLP

(57) ABSTRACT

Methods and systems are provided for controlling vehicle operating parameters depending on whether the vehicle is operating within an area defined by an adjustable geographical boundary, the adjustable geographical boundary defined based on wireless communication between vehicles and infrastructures. In one example, a method comprises determining that the vehicle has entered into an area defined by the adjustable boundary, and adjusting a control mapping of an acceleration control of the vehicle in response to the determining. In this way, fuel economy, emissions, and customer satisfaction may be improved.

20 Claims, 8 Drawing Sheets

(51) Int. Cl.
  *B60K 31/00*  (2006.01)
  *B60W 40/04*  (2006.01)

(52) U.S. Cl.
  CPC . *B60W 2556/65* (2020.02); *B60W 2710/0638* (2013.01); *B60W 2710/0666* (2013.01); *B60W 2720/106* (2013.01)

(58) Field of Classification Search
  CPC ... F01D 17/16; F02F 3/26; G05D 1/00; B60K 31/00
  See application file for complete search history.

(56) References Cited

U.S. PATENT DOCUMENTS

| | | |
|---|---|---|
| 2007/0276582 A1 | 11/2007 | Coughlin |
| 2008/0300768 A1* | 12/2008 | Hijikata ............... F02D 41/021 701/102 |
| 2010/0070153 A1 | 3/2010 | Bradley et al. |
| 2013/0166148 A1 | 6/2013 | Koslow |
| 2014/0257678 A1 | 9/2014 | Boesch et al. |
| 2015/0284000 A1* | 10/2015 | Hayakawa ............ B60W 40/06 701/70 |
| 2015/0291031 A1* | 10/2015 | Morimoto .......... G06K 9/00812 701/70 |
| 2015/0336583 A1* | 11/2015 | Pursifull .............. B60K 28/165 477/92 |
| 2016/0138934 A1 | 5/2016 | Kim |
| 2016/0246526 A1 | 8/2016 | Ricci |
| 2017/0102700 A1* | 4/2017 | Kozak .................. G05D 1/0061 |
| 2017/0138283 A1* | 5/2017 | Pakko ..................... F01N 3/031 |
| 2018/0093668 A1* | 4/2018 | Kim ..................... B60W 50/14 |

FOREIGN PATENT DOCUMENTS

| | | |
|---|---|---|
| DE | 102007053279 A1 | 5/2009 |
| GB | 2318106 A | 4/1998 |
| JP | H10148151 A | 6/1998 |
| JP | H10148253 A | 6/1998 |
| JP | H10152001 A | 6/1998 |
| JP | H10176566 A | 6/1998 |

* cited by examiner

SYSTEMS AND METHODS FOR VEHICLE OPERATION

CROSS REFERENCE TO RELATED APPLICATION

The present application claims priority to Great Britain Patent Application No. 1802134.5, filed Feb. 9, 2018. The entire contents of the above-listed application is hereby incorporated by reference for all purposes.

FIELD

The present description relates generally to methods and systems for adjusting an engine mapping of a vehicle as a function of whether the vehicle is operating within a defined geographical space, the geographical space variable as a function of one or more parameters.

BACKGROUND/SUMMARY

It is increasingly desirable for the fuel economy and exhaust emissions of vehicles, such as motor vehicles, to be improved. This is particularly true for vehicles operating in urban areas, where a large number of vehicles are often present in a relatively small area. Modern vehicles typically comprise a plurality of systems and devices for reducing emissions from the vehicle, and improving fuel economy.

An important contributing factor to the fuel economy and emissions of a vehicle is the driving style of the driver. For example, when a driver accelerates smoothly and avoids having to brake sharply after accelerating, the amount of fuel used, and also the amount of emissions produced can be reduced for a particular journey. However, when driving the vehicle in traffic within an urban area, it becomes increasingly difficult to drive the vehicle without accelerating and braking sharply. Thus, at least in terms of fuel economy and emissions, a control strategy to predict or infer when a vehicle is operating in an urban area such that engine operation may be controlled accordingly, is desirable.

Towards this end, U.S. Pat. No. 8,352,150 discloses an engine control apparatus that includes a driving-state detection means, a storage means for storing mode maps for respective engine control modes plurality of mode maps for controlling engine operation, a selecting means for selecting one of the engine control modes, and an engine-output-command-value determining means for determining the engine output command value by referring to the mode map corresponding to the engine control mode selected by the selecting means. Therein, particular engine control modes are set based on a 'sporty factor', which is based on a degree of ascent or decent of a road, degree of usage of high engine speeds, degree of winding of the road, degree of acceleration or deceleration, degree of operation of the accelerator, vehicle speed, etc. However, in such an example the control over the engine may not strictly be a function of whether or not the vehicle is being operated in a particular (e.g. urban) environment.

The inventors herein have recognized the above-mentioned issues, and have herein developed systems and methods to at least partially address them. In one example, a method comprises propelling the vehicle via an engine, determining that the vehicle has entered into an area defined by an adjustable boundary and adjusting a control mapping of an acceleration control of the vehicle in response to the determining, where the determining further comprises the vehicle receiving one or more communications via a vehicle to vehicle or a vehicle to infrastructure communications system.

As one example of the method, adjusting the control mapping of the acceleration control may further comprise adjusting the control mapping of the acceleration control so that an acceleration of the vehicle varies less for a given change in driver input in response to the vehicle entering into the area defined by the adjustable boundary.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
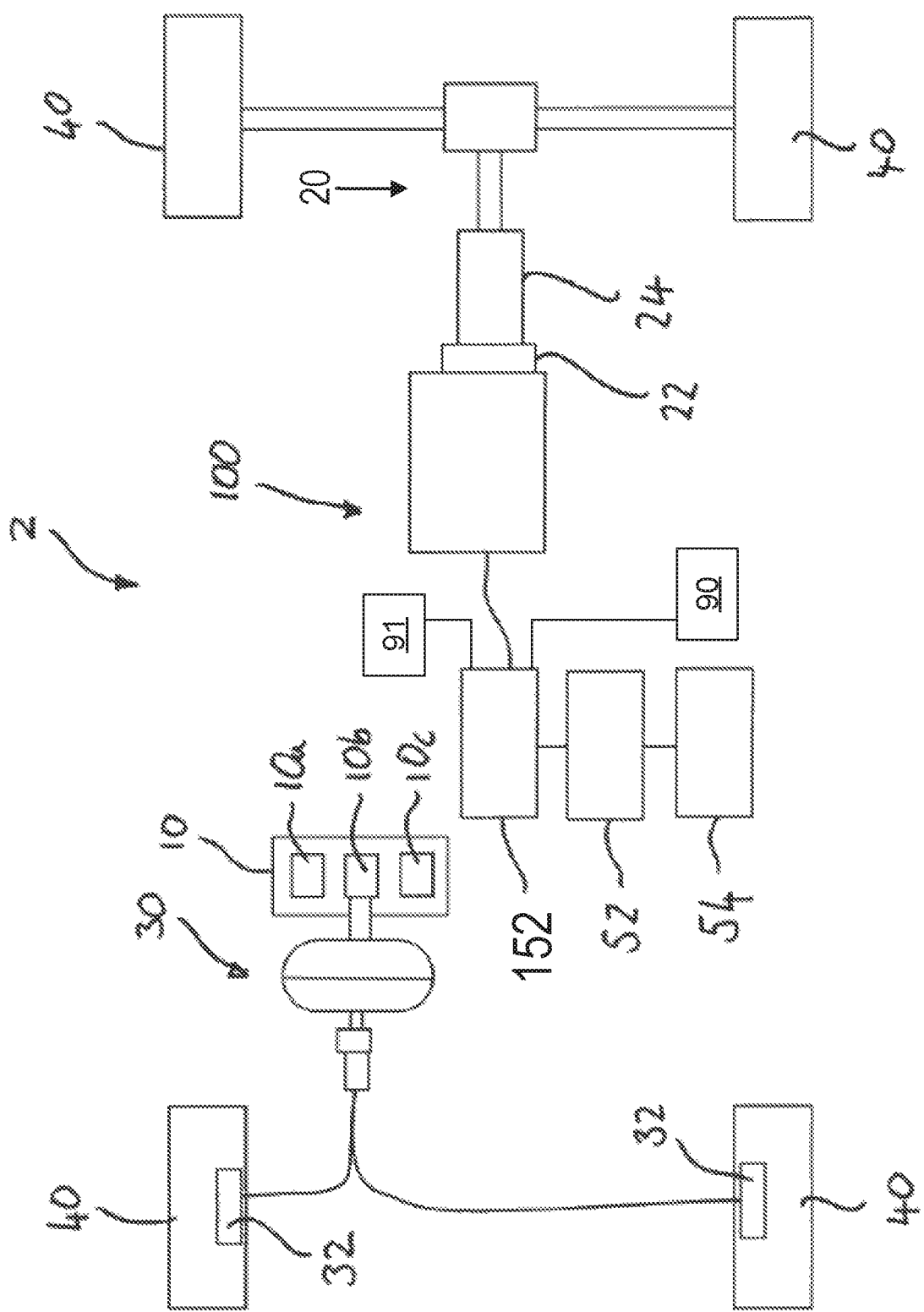
FIG. 1 depicts a schematic view of a vehicle according to arrangements of the present disclosure.
Figure 2:
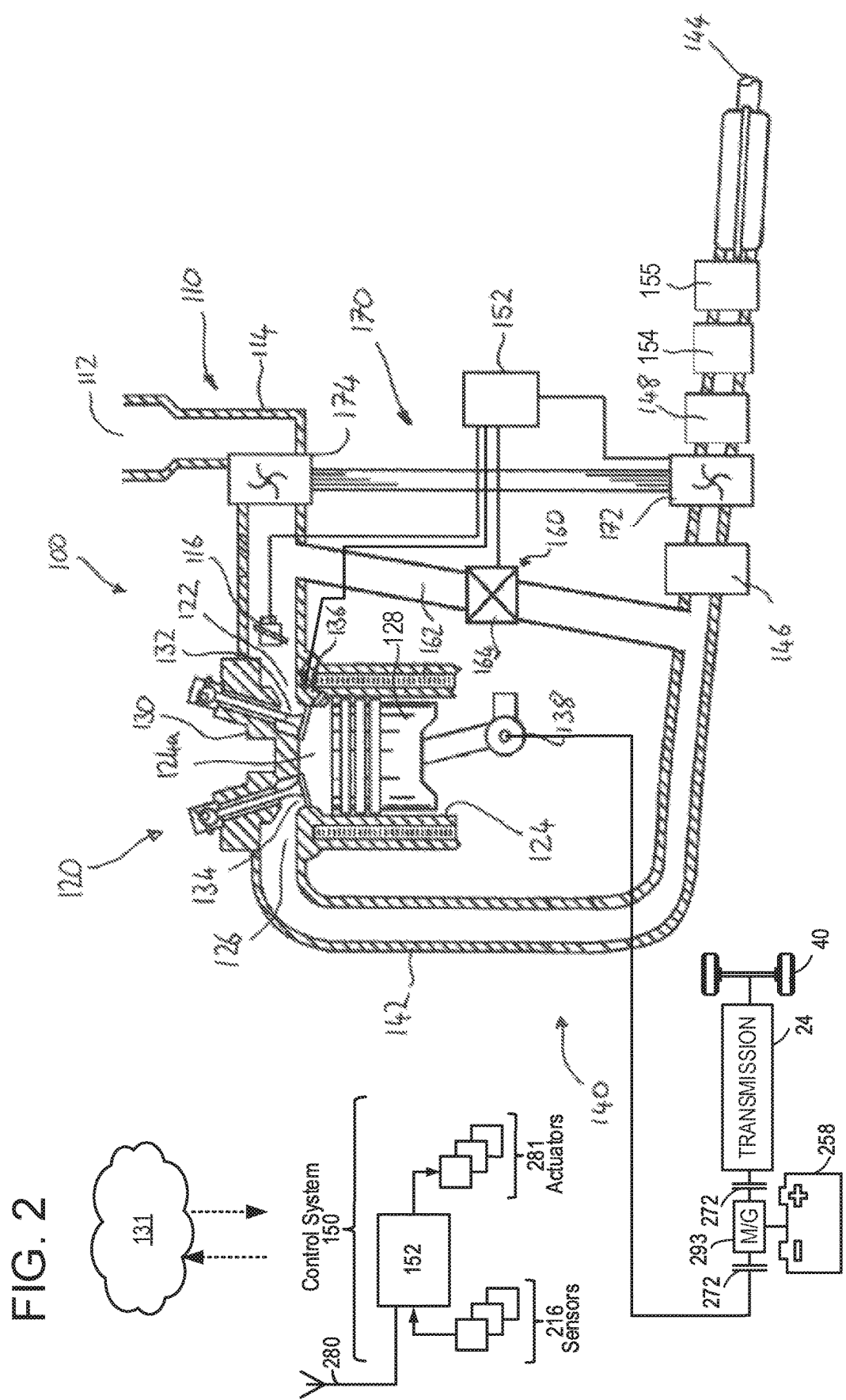
FIG. 2 depicts a schematic view of an engine assembly for a vehicle according to the present disclosure.
Figure 3:
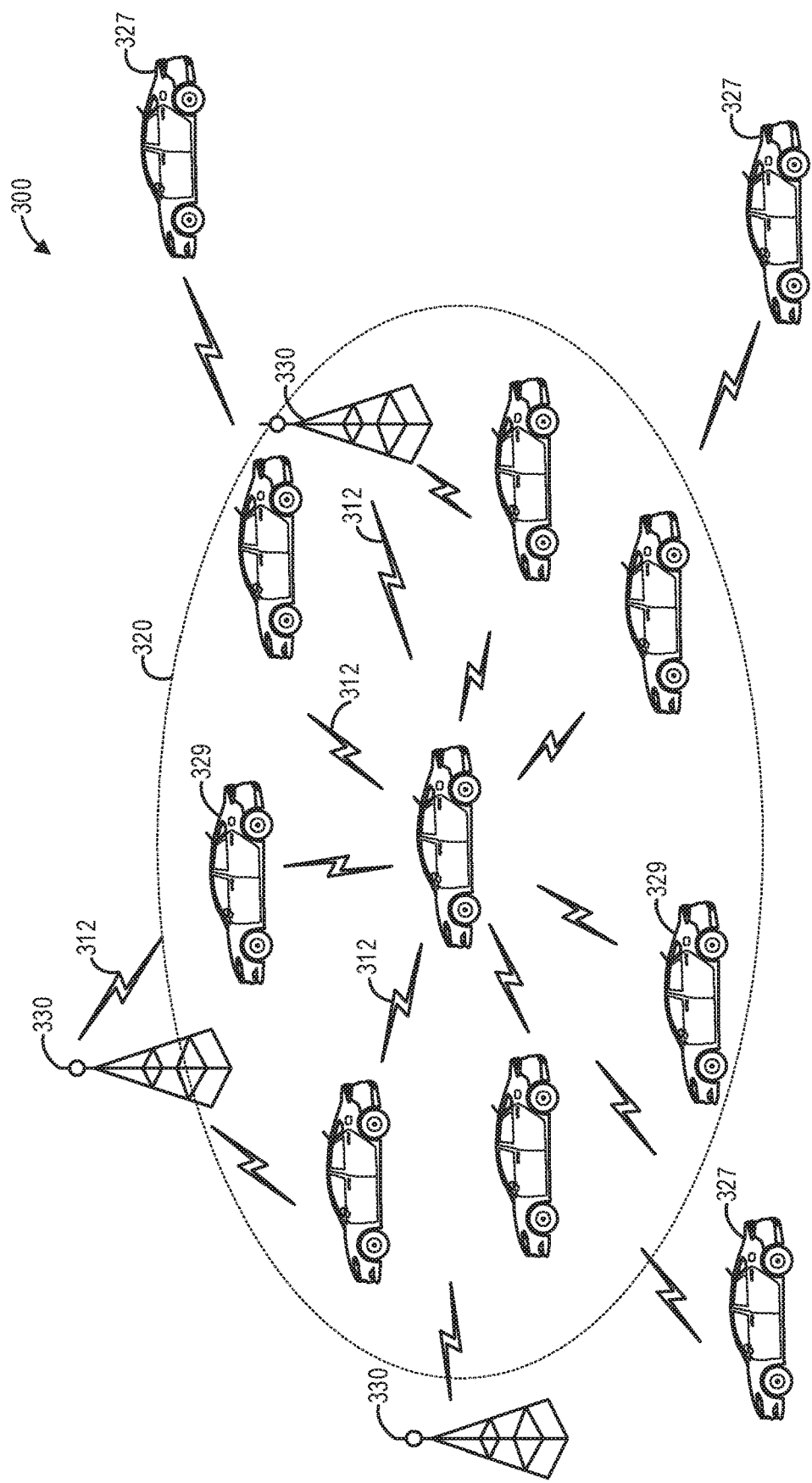
FIG. 3 depicts an example illustration of an adjustable boundary or adjustable geo-fence determined at least in part via V2V and/or V2I communications.
Figure 4:
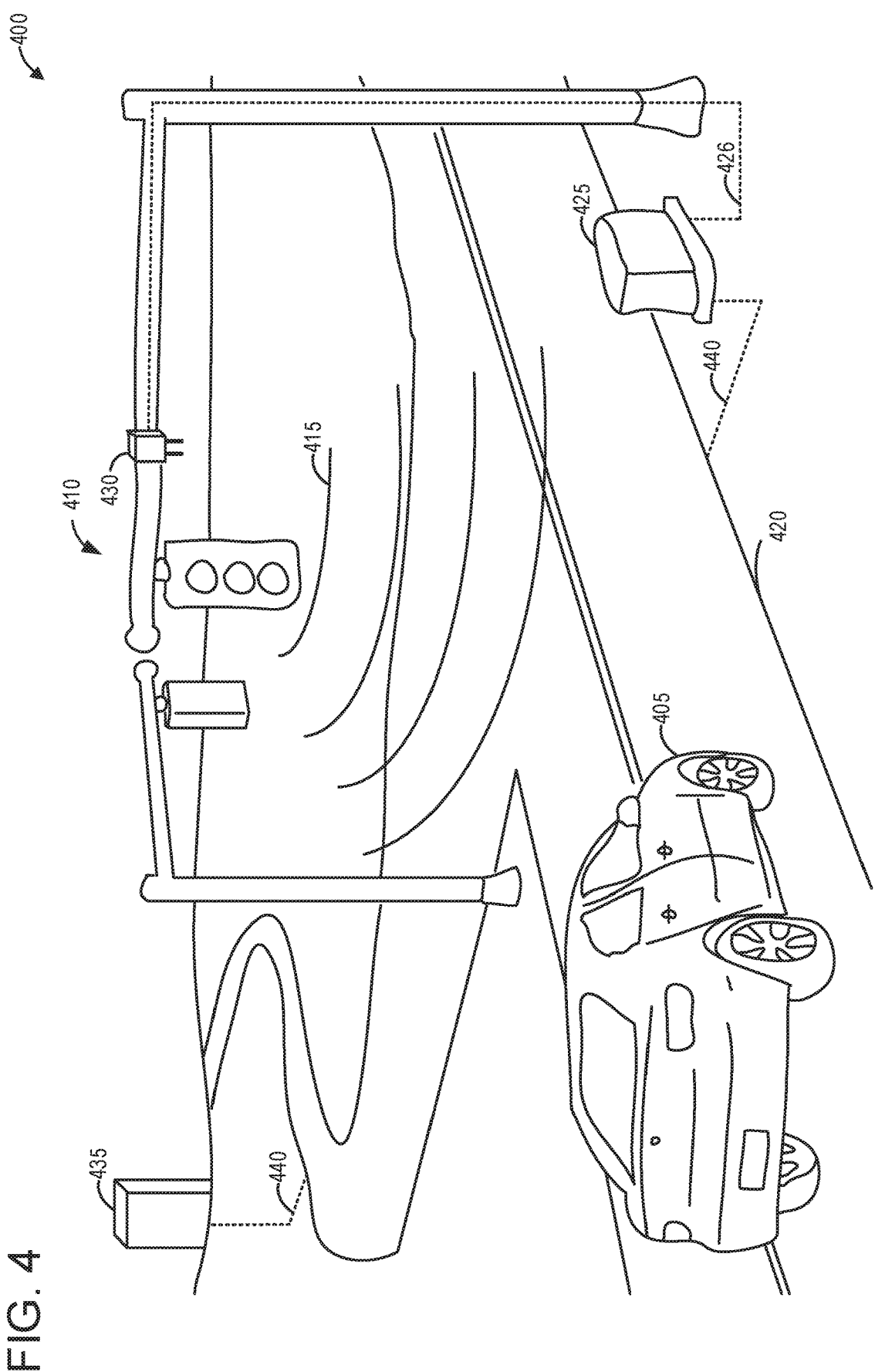
FIG. 4 depicts an example illustration of a smart traffic system used in accordance with the present disclosure for setting an adjustable boundary or adjustable geo-fence.
Figure 5:
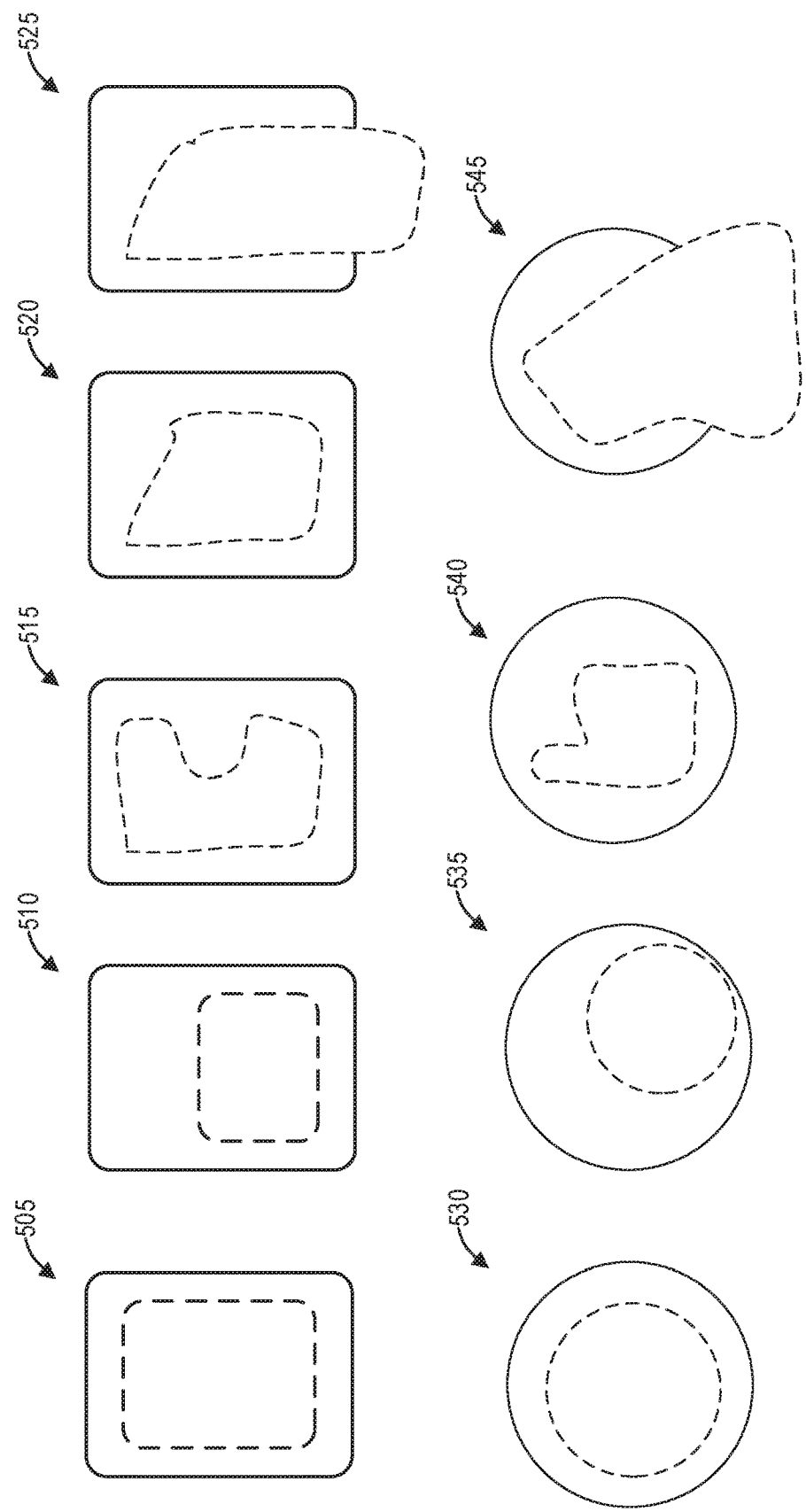
FIG. 5 depicts a plurality of example illustrations depicting how an adjustable boundary may be adjusted, in accordance with the present disclosure.
Figure 6:
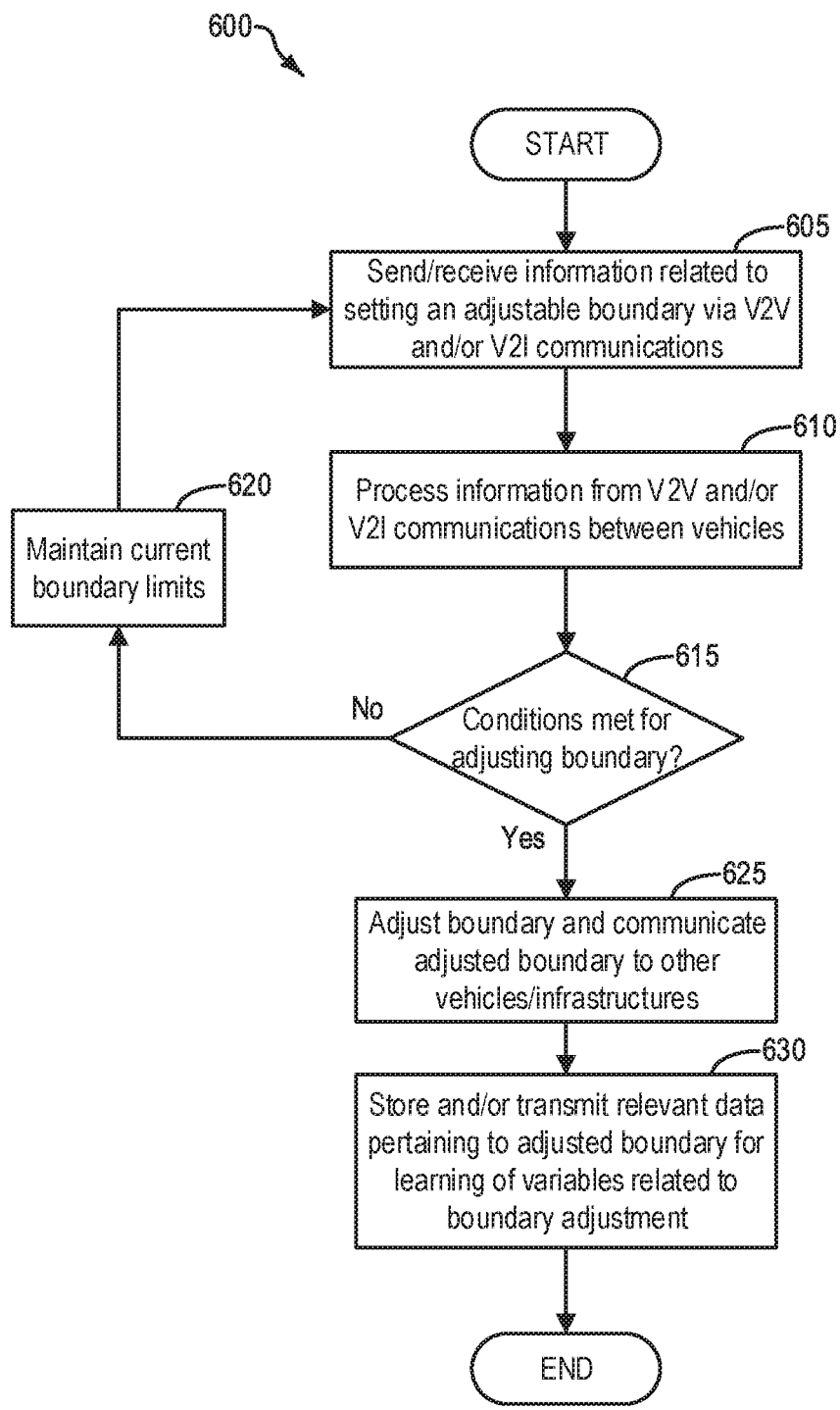
FIG. 6 depicts a high-level example method for setting an adjustable boundary or adjustable geo-fence, in accordance with the present disclosure.
Figure 7:
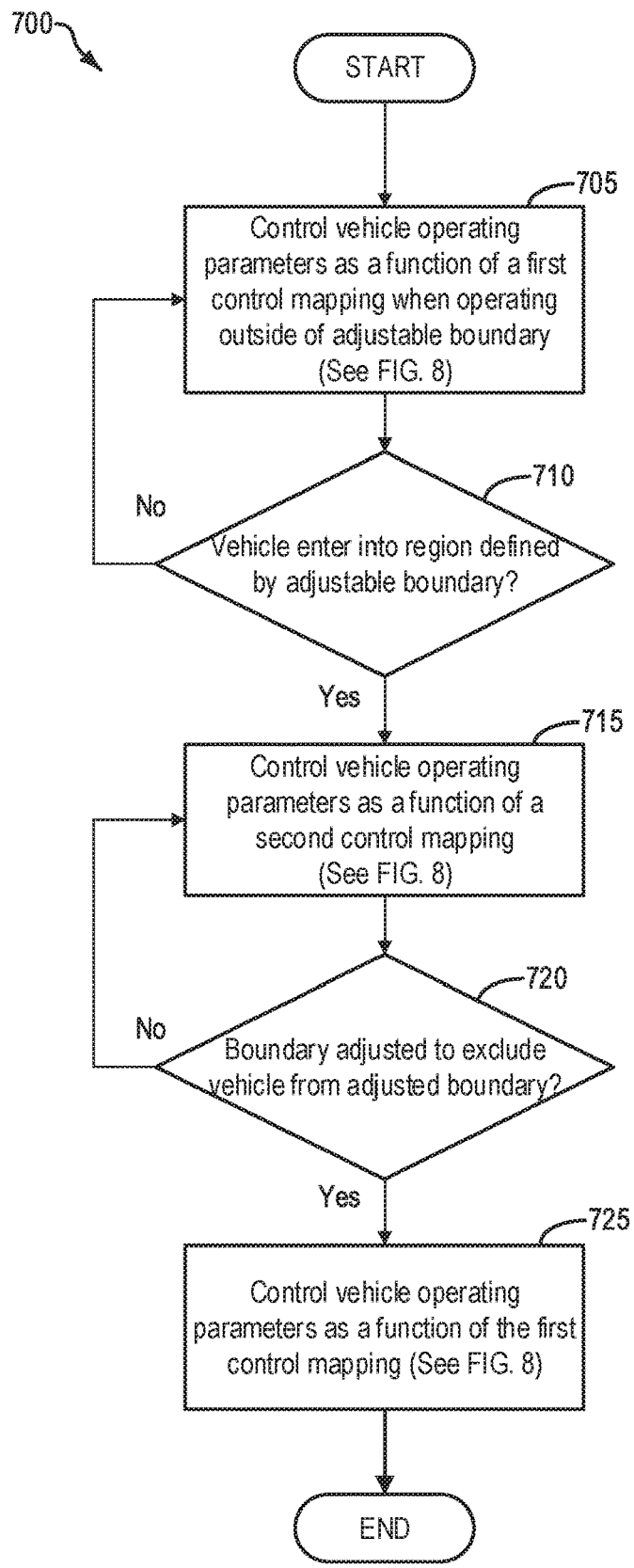
FIG. 7 depicts an example methodology for controlling vehicle operating parameters based on whether the vehicle is operating within the adjustable boundary or outside of the adjustable boundary.
Figure 8:
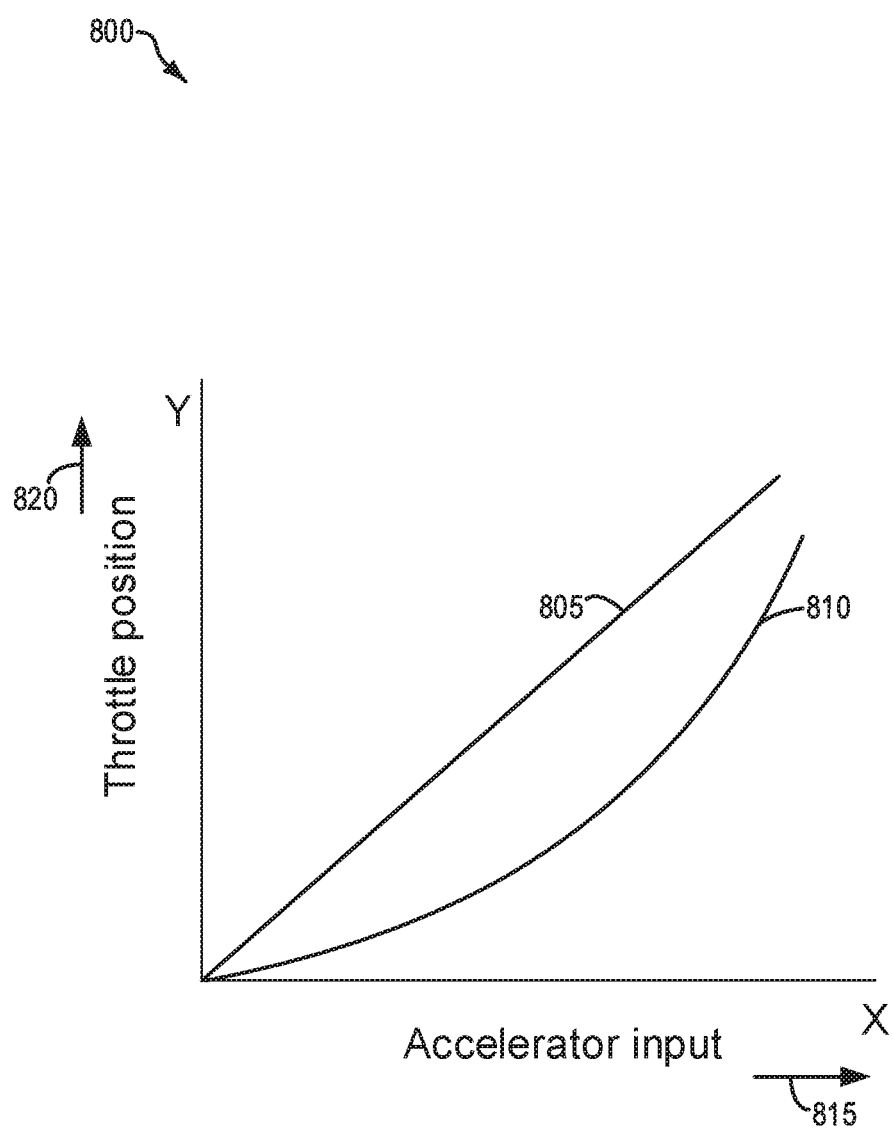
FIG. 8 depicts an example illustration of a first control mapping and a second control mapping for use in accordance with the adjustable boundaries of the present disclosure.

The following description relates to systems and methods for controlling one or more vehicle operating parameters depending on whether the vehicle is operating within an area defined by an adjustable boundary, also referred to herein as an adjustable geo-fence. FIGS. 1-2 depict relevant componentry of the vehicle and engine system of the present disclosure. Discussed herein the adjustable boundary is set based on information communicated between vehicles and/or between vehicles and infrastructures. Accordingly, an example of such an adjustable boundary and the communication systems that enable such adjustment, are depicted at FIG. 3. In some examples, information communicated to and/or retrieved from a smart traffic light system may be at least partially relied upon for adjusting the border of the adjustable boundary. Accordingly, such a smart traffic light system is depicted at FIG. 4. Discussed herein, the adjustable boundary dimensions may be adjusted in a variety of manners (e.g. uniformly adjusted, non-uniformly adjusted), and accordingly, examples of how such an adjustably boundary may be adjusted, are depicted at FIG. 5. A method for adjusting such an adjustable boundary is depicted at FIG. 6. FIG. 7 depicts an example method for controlling vehicle operating parameters according to a first control mapping when operating outside of an area defined by an adjustable boundary, and controlling vehicle operating parameters according to a second control mapping when the vehicle is operating inside or within the area defined by the adjustable boundary. FIG. 8 depicts one example illustration of the first control mapping as compared to the second control mapping.

Discussed herein, a method of operating a vehicle may comprise determining that the vehicle has entered an urban area, or an area defined by an adjustable boundary and adjusting a control mapping (e.g. pedal mapping) of an acceleration control of the vehicle such as an accelerator pedal or a grip twist throttle (e.g. such that an acceleration of the vehicle varies less for a given change in driver input, in response to the vehicle entering the urban area). The step of determining that the vehicle has entered an urban area may comprise receiving one or more communications via a vehicle to vehicle or vehicle to infrastructure communication system. For example, the vehicle may receive information relating to the location of one or more geo-fenced areas indicated as urban area via the vehicle to vehicle or vehicle to infrastructure communication system. Additionally or alternatively, the vehicle may receive information indicating that it is within an urban area via the vehicle to vehicle or vehicle to infrastructure communication system. Furthermore, the dimensions of the adjustable boundary may be adjusted based on vehicle to vehicle communications and/or vehicle to infrastructure communications.

Discussed herein, a change in torque provided by a drive system of the vehicle and/or acceleration performed by the vehicle may vary less in response to a particular accelerator pedal input when the vehicle is operating within the area defined by the adjustable boundary.

In some arrangements, the control mapping may be adjusted so that a degree of acceleration of the vehicle for given driver input is changed, e.g. reduced or increased, depending on whether the vehicle is operating inside or outside of the area defined by the adjustable boundary.

In some examples, the method may comprise adjusting an engine mapping of the vehicle in order to change, e.g. reduce or increase, a torque response of the engine, e.g. to changes in engine speed, in response to the vehicle entering the area defined by the adjustable boundary. In other words, the engine mapping may be adjusted such that a change in torque supplied by a drive system as a result of a change in rotational speed of a crankshaft of the engine is changed, e.g. reduced or increased. The engine mapping may be adjusted so that the rate of acceleration of the vehicle for a given acceleration control input is reduced. Additionally or alternatively, engine mapping may be adjusted in order to improve the responsiveness of the drive system to acceleration control input.

In some arrangements, a change in boost provided by a turbocharger according to accelerator input may be varied, e.g. reduced or increased, such that an acceleration of the vehicle varies less for a given change in driver input, in response to the vehicle entering the area defined by the adjustable boundary.

Additionally or alternatively, a change in the rate of recirculation of exhaust gases for a given change in acceleration control input may be varied, e.g. increased or decreased, so that the acceleration of the vehicle varies less for a given change in driver input, in response to the vehicle operating inside the area defined by the adjustable boundary.

The method may further comprise controlling the operation of the vehicle in order to improve an efficiency of an engine of the vehicle, in response to the vehicle entering the area defined by the adjustable bondary. Controlling the operation of the vehicle may comprise adjusting an engine mapping of the vehicle in order to improve the efficiency of the engine. Additionally or alternatively, controlling the operation of the vehicle may comprise controlling the operation of a turbocharger and/or exhaust gas recirculation system of the vehicle in order to improve efficiency of the engine The method may further comprise controlling the operation of the vehicle in order to reduce an emission of the vehicle, in response to the vehicle entering the area defined by the adjustable boundary. Controlling the operation of the vehicle may comprise adjusting an engine mapping of the vehicle in order to reduce the emission of the vehicle. Additionally or alternatively, controlling the operation of the vehicle may comprise controlling the operation of a turbocharger and/or exhaust gas recirculation system of the vehicle in order to reduce the emission of the vehicle.

In some arrangements, controlling the operation of the vehicle may comprise controlling the operation of one or more exhaust after-treatment device of the vehicle, such as a selective catalytic reduction device or any other exhaust after-treatment device provided on the vehicle, e.g. in order to increase the rate of removal of polluting substances from the emissions by the after-treatment device, as a function of whether the vehicle is operating inside of the area defined by the adjustable boundary, or outside of the area defined by the adjustable boundary.

The method may in some examples comprise predicting whether the vehicle is expected to enter an urban area. The method may further comprise regenerating one or more exhaust after-treatment devices of the vehicle prior to entering the urban area, e.g. when it is expected that the vehicle will enter the urban area. The step of predicting whether the vehicle is expected to enter an urban area may be performed by comparing a route of the vehicle, e.g. programmed into a navigation system of the vehicle or predicted based on a location of the vehicle, with the location of one or more geo-fenced areas indicated as urban areas.

The method may comprise receiving an emissions requirement relevant to the area defined by the adjustable boundary. The method may further comprise controlling the operation of the vehicle according to the emissions requirement, e.g. such that the emissions requirement is met.

According to another aspect of the present disclosure, there is provided, a method of operating a vehicle, the method comprising: determining that the vehicle has entered an area defined by an adjustable boundary; and adjusting an engine mapping of the vehicle in order to change, e.g. reduce or increase, a torque response of the engine, e.g. to changes in engine speed, in response to the vehicle entering the area, wherein determining that the vehicle has entered the area comprises receiving one or more communications via a vehicle to vehicle or vehicle to infrastructure communication system.

Another example of a method for operating a vehicle as discussed herein, comprises propelling the vehicle via an engine, determining that the vehicle has entered into an area defined by an adjustable boundary and adjusting a control mapping of an acceleration control of the vehicle in response to the determining, where the determining further comprises the vehicle receiving one or more communications via a vehicle to vehicle or a vehicle to infrastructure communications system. As one example of the method, adjusting the control mapping of the acceleration control may further comprise adjusting the control mapping of the acceleration control so that an acceleration of the vehicle varies less for a given change in driver input in response to the vehicle entering into the area defined by the adjustable boundary.

In such a method, the area defined by the adjustable boundary may comprise an urban area.

In such a method, the method may further comprise reducing a torque response of the engine in response to the vehicle entering into the area defined by the adjustable boundary. For example, reducing the torque response of the engine may further comprise adjusting an operation of a turbocharger of the vehicle. In another example, reducing the torque response of the engine may further comprise adjusting an operation of an exhaust gas recirculation system of the vehicle.

In such a method, the method may further comprise controlling operation of the vehicle in order to improve an efficiency of the engine of the vehicle, in response to the vehicle entering into the area defined by the adjustable boundary.

In such a method, the method may further comprise controlling operation of the vehicle to reduce an emission of the vehicle, in response to the vehicle entering into the area defined by the adjustable boundary. For example, controlling operation of the vehicle to reduce the emission of the vehicle may further comprise controlling operation of a turbocharger to reduce the emission of the vehicle. In another example, controlling operation of the vehicle to reduce the emission of the vehicle may further comprise controlling operation of an exhaust gas recirculation system of the vehicle to reduce the emission of the vehicle. In yet another example, controlling the operation of the vehicle to reduce the emission of the vehicle may further comprise controlling the operation of an exhaust after-treatment device of the vehicle. In examples where the method involves controlling operation of the vehicle to reduce an emission of the vehicle, the method may further comprise predicting the vehicle will enter into the area defined by the adjustable boundary, and controlling the operation of the exhaust after-treatment device in response to the predicting.

In such a method, the method may further comprise receiving an emissions requirement relevant to the adjustable boundary, and controlling operation of the vehicle according to the emissions requirement.

Another example of a method for a vehicle comprises controlling the vehicle based on a first control mapping for controlling one or more vehicle operating parameters when it is determined that the vehicle is operating outside an area defined by an adjustable geo-fence; controlling the vehicle based on a second control mapping for controlling the one or more vehicle operating parameters when it is determined that the vehicle is operating inside of the area defined by the adjustable geo-fence; and in response to a boundary of the adjustable geo-fence being adjusted to exclude the vehicle from the area defined by the adjustable geo-fence, controlling the vehicle based on the first control mapping.

In such a method, the boundary of the adjustable geo-fence may be adjusted based on a vehicle communications system that includes vehicle to vehicle and vehicle to infrastructure communications.

In such a method, the boundary may be adjusted as a function of one or more of traffic conditions and weather conditions.

In such a method controlling the vehicle based on the second control mapping may involve adjusting an engine mapping of the vehicle so that a rate of acceleration of the vehicle for a given acceleration control input is reduced, as compared to the first control mapping.

In such a method, controlling the vehicle based on the second control mapping may involve reducing an emission of the vehicle as compared to controlling the vehicle based on the first control mapping.

With reference to FIG. 1, a vehicle 2, e.g. a motor vehicle, may comprise driving controls 10, an engine assembly 100 (which includes engine 120 depicted at FIG. 2), a drive train 20 and a brake system 30. The driving controls 10 may comprise one or more controls to enable a driver of the vehicle to control its operation. In the arrangement shown, the controls include an acceleration control 10a, a braking control 10b and a clutch control 10c. However, in other arrangements different controls may be provided. For example, if the drive train 20 comprises an automatic transmission, the clutch control 10c may be omitted. In the arrangement shown in FIG. 1, the driving controls 10 comprise pedals to be operated by the driver using their feet. However, in other arrangements, the driving controls 10 may take other forms, such as hand operated levers or grip twist controls.

The drive train 20 is configured to transfer power from the engine assembly 100 to wheels 40 of the vehicle. As depicted, the drive train 20 may comprise a clutch 22 configured to operatively couple the drive train 20 to the engine assembly 100, and a gear box or transmission 24 configured to allow a drive ratio of the drive train 20 to be selectively varied.

The brake system 30 comprises brakes 32, e.g. brake calipers, configured to selectively engage with surfaces associated with the wheels 40, such as brake discs (not shown), in order to apply a braking torque to the wheels 40. The brake system 30 can be operated by the driver by depressing the brake pedal 10b.

Turning to FIG. 2, the engine assembly 100 comprises an intake system 110, an engine 120, an exhaust system 140 and a control system 150 configured to control the operation of the engine assembly 100. Intake system 110 comprises an air inlet 112 and an intake duct 114. During operation of the engine 120, air is drawn into the intake system 110 via the air inlet 112 and carried to an inlet manifold 122 (also referred to herein as intake manifold) of the engine 120 by the intake duct 114. The intake system 110 may comprise a throttle 116 configured to allow a pressure drop between the air inlet 112 and the intake manifold 122 to be selectively varied. The position of the throttle may be controlled by a driver of the vehicle, e.g. using the acceleration control 10a, in order to control the operation of the engine 120. The throttle 116 may be controlled directly by the acceleration control 10a. Alternatively, the throttle 116 may be controlled indirectly, e.g. by a controller receiving an input from the acceleration control 10a.

Engine 120 comprises the inlet manifold 122, cylinder 124 and an outlet manifold 126. A piston 128 is provided within the cylinder 124 and is configured to reciprocate within the cylinder 124 during a combustion cycle of the engine 120. A combustion chamber 124a of the cylinder 124 is defined the piston 128, the walls of the cylinder 124 and cylinder head 130. Engine 120 further comprises one or more inlet valves 132 (also referred to herein as intake valves) and one or more exhaust valves 134 to control the flow of inlet and exhaust gases into and out of the cylinder 124 respectively.

During an intake stroke, the piston 128 moves within the cylinder 124 to increase the volume of the combustion chamber 124a, drawing inlet gases from the inlet manifold 122 into the cylinder via the inlet valves 132. Following the intake stroke, the inlet valve 132 is closed and the gases within the cylinder 124 are compressed as the piston 128 moves back towards the cylinder head 130, reducing the volume of the combustion chamber 124a.

Fuel is injected into the cylinder 124 via one or more fuel injectors 136 and the air and fuel mixture is ignited by virtue of the high pressure and temperature within the combustion chamber 124a. Combustion of the air and fuel mixture produces expanding combustion gases that act against the piston 128 to drive a crank shaft 138 of the engine 120.

The timing with which fuel is injected into the cylinder 124, and the amount of fuel injected relative to the amount of inlet air, may affect the power and/or torque produced by the engine. The timing and amount of fuel being injected may also affect the efficiency at which the engine is operation. Furthermore, the timing and amount of fuel, and the amount of inlet air introduced into the cylinder 124 may affect the production of polluting gases during combustion.

In the arrangement depicted in FIG. 2, the engine 120 is a compression ignition engine. However, it is equally envisaged that the present disclosure may apply to any other type of engine, such as a spark ignition engine in which the fuel-air mixture within the cylinder 124 is ignited by a spark plug. Furthermore, although a single cylinder is shown in FIG. 2, the engine 120 may comprise any number of cylinders, such as 2, 3, 4, 6, 8 or more than 8 cylinders.

During an exhaust stroke of the piston 128, exhaust gases produced through the combustion within the cylinder are exhausted from the cylinder 124 into the exhaust manifold 126 via the exhaust valve 134.

An exhaust duct 142 of the exhaust system 140 is arranged to carry the exhaust gases from the exhaust manifold 124 to an exhaust outlet 144 to be emitted from the vehicle.

The exhaust system 140 further comprises one or more exhaust gas after-treatment devices configured to reduce the concentrations of one or more pollutant substances within the exhaust gases. For example, in the arrangement depicted, the exhaust system 140 comprises a catalytic oxidation device 146, configured to oxidize soot and/or carbon monoxide, a NOx adsorber 148, configured to adsorb NOx from the exhaust gases, a particulate filter 154, configured to capture particular matter from the exhaust gases, and a catalytic reduction device 155 configured to remove NOx from the exhaust gases through a chemical reduction reaction in the presence of a catalyst.

In some arrangements, the exhaust system 140 may comprise other exhaust gas after-treatment devices in additional or as an alternative to those depicted in FIG. 2. Alternatively, one or more of the after-treatment devices shown in FIG. 2 may be omitted. In some arrangements, two or more after-treatment devices may be combined into a single device. For example, the exhaust system 140 may comprise a combined particulate filter and catalytic reduction device.

The operation of the exhaust gas after-treatment devices may be controlled in order to adjust the performance of the devices in removing pollutants from the exhaust gases. For example, the performance of the catalytic reduction device 155 may be adjusted by controlling the amount of reductant that is introduced.

The operation of one or more of the exhaust gas after-treatment devices may be controlled in order to conform to one or more emissions requirements. The emissions requirements may be predetermined emissions requirements. For example, the emissions requirements may be set by legislation. The vehicle may be configured such that the exhaust gas after-treatment devices meet the emissions requirements during manufacture of the vehicle.

Alternatively, the emissions requirements may be variable emissions requirements that change during operation of the vehicle. For example, the emissions requirements may vary depending on the time of day and/or depending on a location in which the vehicle is operating. As described below, the emissions requirements may vary when the vehicle is operating in an urban area.

One or more of the exhaust gas after-treatment devices, such as the NOx adsorber 148, may have a limited capacity for removing pollutant substances from the exhaust gases. When the capacity of the exhaust gas after-treatment device is reached no more of the pollutant substance may be stored within the exhaust gas after-treatment device. The exhaust after-treatment devices may be regenerated in order to enable more of the pollutant substances to be removed. For example, the NOx adsorber 148 may be regenerated by injecting additional fuel into the cylinder 124 so that the temperature of the exhaust gases is increased and unburnt hydrocarbons are introduced into the exhaust gases. NOx stored within the NOx adsorber 148 may be desorbed due to the high temperature and may react with the unburnt hydrocarbons to form nitrogen gas and water, which may be emitted from vehicle 2.

As the exhaust gas after-treatment device nears capacity, the performance of the device may become reduced, e.g. the rate at which polluting substances can be captured may be reduced. Regenerating the exhaust gas after treatment device may therefore improve the performance of the after-treatment device in removing pollutants from the exhaust gases.

The engine assembly 100 may further comprise an Exhaust Gas Recirculation (EGR) system 160. The EGR system 160 comprises an EGR duct 162 configured to recirculate a portion of the exhaust gases to the intake system 110 of the engine assembly 100, e.g. to the intake duct 114 or to the inlet manifold 122. The EGR system 160 further comprises an EGR valve 164 configured to control the flow of exhaust gases through the EGR duct 162.

Replacing a portion of the oxygen rich inlet air within the engine cylinder 124 with burnt exhaust gases reduces the volume of the combustion chamber 124a that is available for combustion. This reduces the peak temperature of combustion, thereby reducing the formation of NOx. Furthermore, by controlling the quantity of exhaust gases being recirculated, the power provided by the engine 120 may be controlled without throttling the inlet air. The position of the EGR valve 164 may be controlled in some examples depending on the position of the accelerator pedal 10a in order to control the power provided by the engine 120.

As depicted in FIG. 2, the engine assembly 100 may further comprise a turbocharger 170 including an exhaust driven turbine 172 arranged in the exhaust duct 142 and a compressor 174 arranged in the inlet duct 114. The turbine 172 and the compressor 174 are coupled to the same shaft so that the compressor 174 can be driven by the turbine 172 to increase the pressure of inlet gases entering the inlet manifold 122.

The turbine 172 may be a variable geometry turbine comprising a plurality of inlet vanes, the angles of which are adjustable in order to adjust a flow path of exhaust gases entering the turbine. Controlling the flow path of exhaust gases entering the turbine 172 affects the pressure ratio across the turbine 172, which in turn affects the power generated by the turbine 172 for driving the compressor 174. In short, the angle of the inlet vanes can be controlled in order to control the operation of the turbocharger 170.

Additionally or alternatively, the turbocharger 170 may comprise a turbine bypass (not shown) arranged to allow a controllable portion of the exhaust gases to bypass the turbine 172. In this way, the operation of the turbocharger 170 may be controlled by controlling the proportion of exhaust gases bypassing the turbine 172.

By appropriately controlling the operation of the turbocharger 170 and the EGR system 160, NOx emissions can be controlled without reducing the power provided by the engine 120. Additionally, controlling the operation of the turbocharger 170 and/or the EGR system 160 can be used to control the efficiency at which the engine 120 is operating.

The control system 150 of the engine assembly 100 comprises a controller 152, such as an engine control unit or power train control unit. The controller 152 may be configured to control the operation of the inlet throttle 114, the EGR valve 164 and/or the turbocharger turbine 172, in order to control the power being provided by the engine.

Control system 150 is shown receiving information from a plurality of sensors 216 (various examples of which are described herein) and sending control signals to a plurality of actuators 281 (various examples of which are described herein).

The control applied by the controller 152 is based on a control mapping which relates the input provided by the driver, e.g. using the acceleration control 10a, to the positions of the inlet throttle 114 and/or the EGR valve 164, the operation of the turbocharger turbine 172 and/or the operation of any other component of the engine assembly 100 that affects the power or torque provided by the engine 120. The control mapping may be stored within a memory associated with the controller 152.

The controller 152 may also be configured to control, e.g. directly control, the operation of the engine 120, e.g. by controlling the timing and quantity of fuel being introduced into the cylinder 124 by the injector 136. The controller 152 may control the operation of the engine 120 according to an engine mapping stored within a memory associated with the controller 152. The engine mapping may define the quantities and timings of fuel to be injected into the cylinder 124 depending on the operating conditions of the engine assembly 100, such as the pressure of inlet gases and amount of exhaust gases being recirculated.

Additionally or alternatively, the controller 152, or another controller of the vehicle 2, may be configured to control the operation of the exhaust gas after-treatment devices, e.g. in order to effect the amount of polluting substances being emitted from the vehicle 2.

Control system 150 may be communicatively coupled to other vehicles or infrastructures using appropriate communications technology, as is known in the art. For example, control system 150 may be coupled to other vehicles or infrastructures via a wireless network 131, which may comprise Wi-Fi, Bluetooth, a type of cellular service, a wireless data transfer protocol, and so on. Specifically, a wireless communication device 280 may be coupled to the vehicle controller(s) 212, for enabling wireless communication. Control system 150 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 150 may be communicatively coupled to other vehicles or infrastructures via a wireless network 131 and the internet (e.g. cloud), as is commonly known in the art.

Accordingly, returning to FIG. 1, depicted is controller 152, a navigation system 52, e.g. a satellite navigation system or global positioning system (GPS)), and a communication system 54. The communication system 54 may be a vehicle to vehicle communication system. Additionally or alternatively, the communication system 54 may be a vehicle to infrastructure communication system.

Navigation system 52 may include one or more location sensors for assisting in estimating vehicle speed, vehicle altitude, vehicle position/location, etc. This information may be used to infer engine operating parameters, such as local barometric pressure. As discussed above, control system 150 may further be configured to receive information via the internet or other communication networks. Information received from the GPS may be cross-referenced to information available via the internet.

Furthermore, controller 152 may receive information from inertial sensor(s) 90. Controller may further receive information from navigational sensors 91. Navigational sensors 91 may include but are not limited to lasers, radar, sonar, acoustic sensors, onboard camera(s) etc.

Returning to FIG. 2 vehicle 2 may be a hybrid vehicle with multiple sources of torque available to one or more vehicle wheels 40. In the example shown, vehicle 2 may include an electric machine 293. Electric machine 293 may be a motor or a motor/generator. Crankshaft 138 of engine 120 and electric machine 293 are connected via a transmission 24 to vehicle wheels 40 when one or more clutches 272 (e.g. same as 22) are engaged. In the depicted example, a first clutch is provided between crankshaft 138 and electric machine 293, and a second clutch is provided between electric machine 293 and transmission 24. Controller 152 may send a signal to an actuator of each clutch 272 to engage or disengage the clutch, so as to connect or disconnect crankshaft 138 from electric machine 293 and the components connected thereto, and/or connect or disconnect electric machine 293 from transmission 254 and the components connected thereto. Transmission 24 may be a gearbox, a planetary gear system, or another type of transmission. The powertrain may be configured in various manners including as a parallel, a series, or a series-parallel hybrid vehicle.

Electric machine 293 receives electrical power from a traction battery 258 to provide torque to vehicle wheels 40. Electric machine 293 may also be operated as a generator to provide electrical power to charge traction battery 258, for example during a braking operation.

Discussed herein, it is recognized that it may be desirable in some situations to control how a vehicle is operated depending on a particular location that the vehicle is operating in. For example, when operating in a particular location, it may be desirable to control vehicle operational parameters in order to achieve a desired fuel economy, achieve a desired level of emissions, etc. In one example, such a location may be defined by a predetermined boundary or fence (e.g. geo-fence). However, it is herein recognized that such predetermined areas may fail to account for a variety of variables (e.g. current traffic levels, weather conditions, time of day, etc.) under which such a predetermined boundary may not be optimal for achieving desired fuel economy, desired level of emissions, etc. It may instead be desirable for such a boundary to be adaptable to changing conditions related to traffic flow, weather conditions, time of day, etc. In this way, control of vehicle operating parameters may be tuned to current conditions, and may thus improve overall vehicle operation efficiency, including but not limited to fuel economy targets and emissions targets.

Accordingly, turning now to FIG. 3, example illustration 300 is depicted, depicting a predetermined boundary, or geo-fence 320. Within boundary 320, it may be understood that it may be desirable to control one or more vehicle operating parameters in a way as to achieve one or more desired targets (e.g. desired fuel economy target, desired emissions target, etc.) Alternatively, when operating outside of boundary 320, it may not be desirable to control the vehicle via such parameters, and instead different control strategy may be desired.

In one example, the area within boundary 320 may comprise an urban area, whereas outside of boundary 320 may comprise a different area that is not defined as urban. As one example, an urban area may comprise an area with a particular density of buildings, particular average density of vehicles, particular population density, etc. Outside of the urban area (e.g. outside of boundary 320 in this example), one or more of the density of buildings, density of vehicles, and/or population density may be lower. As such, different vehicle operating conditions may be desired when operating within boundary 320 as compared to operating outside of boundary 320, as alluded to above.

However, such a predetermined boundary 320 may not take into account a number of variables, as discussed above, which may influence the way in which control of vehicle operation is desired. To address this, one or more of V2V (vehicle-to-vehicle), V2I (vehicle-to-infrastructure) and V2I2V (vehicle-to-infrastructure-to-vehicle) may be used to infer current conditions with respect to boundary 320, such that the boundary can be adjusted under particular situations. In one example, boundary 320 may be increased, in other examples boundary 320 may be decreased. The increasing or decreasing may not be uniform, for example (as will be discussed in further detail below) a particular portion of the boundary may be adjusted whereas other portions are maintained. Accordingly, discussed herein, a boundary such as boundary 320 which may be variable based on information determined via V2V or V2I communications, is referred to as an adjustable boundary.

Thus, depicted are a plurality of vehicles 329 that are operating within boundary 320. Further depicted are a plurality of vehicles 327 that are operating outside of boundary 320. Via wireless communication 312 between vehicles 329 operating within boundary 320, vehicles 327 operating outside of boundary 320, and one or more infrastructures 330, boundary 320 may be adjusted. As one example, at a particular time of day, traffic may be much lighter within boundary 320 as compared to other times of day. As such, when traffic is lighter, as determined via the V2V and/or V2I communications, boundary 320 may be decreased in size. Alternatively, when traffic is heavier, boundary 320 may be increased. Such adjustments may not be limited to vehicle traffic, but may include compensation for particular weather conditions. Such adjustments may additionally or alternatively be based on presence or absence of accidents, presence or absence of construction work, time of day when an amount of pedestrians are increased as compared to other times, etc., as mentioned. Control of vehicle operating parameters, under control of the controller (e.g. 152), may be adjusted based on said V2V and/or V2I communications. For example, once a vehicle (e.g. 327) crosses an adjustable boundary, then the controller may correspondingly adjust control of vehicle operating parameters to conform to particular fuel economy and/or emissions targets corresponding to said adjustable boundary.

In some examples it may be desirable to predict when a vehicle (e.g. 327) is going cross an adjustable boundary, such that one or more actions may be taken prior to the vehicle crossing the adjustable boundary. For example, such a prediction may be enabled via V2V and/or V2I communications. Additionally or alternatively, such a prediction may be enabled via comparing a route of the vehicle (e.g. programmed into the navigation system) with the adjustable boundary, where the geographical locations corresponding to the boundary are communicated to the vehicle predicted to enter into the adjustable boundary via one or more of V2V, V2I, wireless communication between the vehicle and a relevant internet site, etc.

In one example, it may be desirable to predict when a vehicle is going to cross a particular adjustable boundary in order to improve a way in which the vehicle may meet a particular target when operating within said adjustable boundary. For example, if a particular emissions target is defined by the adjustable boundary, then by predicting when the vehicle will cross the adjustable boundary, an exhaust after-treatment device may be regenerated within a threshold time (e.g. within 30 seconds or less, within 1 minute or less, etc.) of the vehicle crossing the boundary, within a threshold distance (e.g. within 100 feet, within 200 feet, etc.) of when the vehicle is predicted to cross the boundary, etc. In this way, by regenerating the exhaust after-treatment device prior to the vehicle crossing the adjustable boundary performance of the exhaust after-treatment device may be improved thus enabling the vehicle to meet the emissions target, for example.

In terms of predicting when the vehicle will cross a particular adjustable boundary, such a prediction may in some examples be based on driving routines that are learned over time, in conjunction with the adjustable boundary dimensions as determined via V2V or V2I communications. Specifically, particular vehicles may be capable of learning when and how to control vehicle operating parameters. Such vehicles may continuously collect data from various sensor systems, other vehicles, infrastructures, etc., in order to learn over time when it is likely that the vehicle will be operating within a particular adjustable boundary. In this way, predictions of when the vehicle is expected to cross such adjustable boundary(s) may be enabled. Data collected for such learning may be via the navigation system and any number of other sensors including but not limited to inertial sensors (e.g. 90), navigational sensors (e.g. lasers, radar, sonar, acoustic sensors, onboard camera(s) etc.), etc. Such data may further include information retrieved from other vehicles or infrastructures, as discussed. Such collected data may be processed, for example via machine learning methodology, such that predicted driving routes may be determined with high accuracy. More specifically, such collected data may be fed into an algorithm that feeds into one or more machine learning algorithms to determine common vehicle travel routes. Such an example is meant to be illustrative, and is not meant to be limiting. For example, any commonly used methodology for vehicle route learning may be utilized via the vehicle controller in order to establish learned travel routes without departing from the scope of this disclosure. Such routes that are not determined to be common may be discarded, to prevent the accumulation of exorbitant amounts of data.

While boundary 320 depicted at FIG. 3 is not explicitly illustrated to be adjusted, it may be understood that boundary 320 comprises an adjustable boundary, and particular illustrative examples of adjusted boundaries are depicted in further detail at FIG. 5.

Turning to FIG. 4, one example of V2I/V2V communications which may be useful for adjusting geographical boundaries for use in conjunction with controlling vehicle operating parameters within said boundaries is depicted. Specifically, example illustration 400 depicts an illustrative vehicle 405 in wireless communication 415 with a smart traffic light 410. Vehicle 405 is depicted as traveling along road 420. Traffic signal controller 425 may transfer information via wired communication 426 on traffic signal phase (e.g. whether the signal is green, yellow or red, duration of time until light changes, etc.), to roadside unit 430. Roadside unit 430 may then broadcast (e.g. wireless communication 415) or transmit such information to vehicle 405, where it may be processed via the controller (e.g. 152). As depicted, the transfer of information between traffic signal controller 425 and roadside unit 430 is via wired communication 426, although in other embodiments such communication may be wireless, without departing from the scope of this disclosure. A traffic management center 435 may collect and process data related to traffic information and/or vehicle information. For example, cables 440 (e.g. fiber optics cables) may communicatively connect traffic signal controller 425 with traffic management center 435, and traffic management center 435 may further be in wireless communication with vehicle 405 (and other vehicles which are not shown in illustration 400). While cables 440 are depicted as providing the communication of information between traffic signal controller 425 and traffic management center 435, it may be understood that in other examples such communication may comprise wireless communication, without departing from the scope of this disclosure. Furthermore, traffic management center 435 may comprise one of a local or state back office, private operator, etc. It may be understood that while roadside unit 430 may broadcast traffic light information to vehicle 405, vehicle 405 may also broadcast information related to current traffic conditions as inferred via V2V communications to roadside unit 430. In this way, timing of traffic light changes may in some examples be based on information retrieved from communication with one or more vehicles (e.g. 405).

In other words, smart traffic light 410 may thus communicate to vehicle 405 a status of smart traffic light. For example, smart traffic light 410 may communicate to vehicle 405 how frequently the light changes (e.g. from green to red or vice versa). Frequency of light changes may in some examples depend on time of day or other variables which may allow for adjusting of such frequency in order to improve a flow of traffic. In some examples, such frequency may be based on communication between smart traffic lights 410 and one or more vehicles (e.g. 405). More specifically, based on V2V communication between a plurality of vehicles, current variables related to traffic flow (e.g. weather conditions, density of vehicles, density of pedestrians, etc.) may be communicated to smart traffic light 410, which may then be used as information for adjusting frequency of traffic light changes. Such information may then be utilized to adjust a geographical boundary (e.g. 320) that defines an area within said boundary where it is desired to control vehicle operating parameters in a manner different than outside of said boundary.

Thus, discussed herein, a system for a vehicle may comprise an engine, a communications system, and a controller with computer readable instructions stored on non-transitory memory. When executed, said instructions may cause the controller to send a request via the communications system requesting information as to a boundary of an adjustable geo-fence, receive the request related to the boundary of the adjustable geo-fence, determine if the vehicle is operating within the boundary of the adjustable geo-fence, control one or more vehicle operating parameters based on whether the vehicle is operating within the boundary of the adjustable geo-fence or outside of the adjustable geo-fence. In one example of such a system, the controller may store further instructions to control the one or more vehicle operating parameters based on a first control mapping when the vehicle is operating outside of the adjustable geo-fence. The controller may store further instructions to control the one or more vehicle operating parameters based on a second control mapping when the vehicle is operating inside of the adjustable geo-fence, where controlling the one or more vehicle operating parameters based on the second control mapping involves one or more of reducing an acceleration rate of the vehicle for a given acceleration control input and reducing an emission of the vehicle, as compared to controlling the one or more vehicle operating parameters based on the first control mapping.

As mentioned above, the manner in which adjustable boundaries as discussed herein are adjusted may comprise a uniform adjustment in some examples, wherein in other examples such adjustment may be non-uniform. Accordingly, turning to FIG. 5, various examples of how adjustable boundaries may be changed, are depicted. Specifically, for each of the examples depicted at FIG. 5, a first boundary is depicted as a solid line, whereas a second, adjusted boundary is depicted as a dashed line. The various examples depicted at FIG. 5 are meant to be illustrative, to emphasize the point that the first boundary may be adjusted in any manner based on V2V/V2I communications.

Depicted is first example illustration 505, second example illustration 510, third example illustration 515, fourth example illustration 520, fifth example illustration 525, sixth example illustration 530, seventh example illustration 535, eighth example illustration 540, and ninth example illustration 545. Of the above mentioned examples, example illustrations 525 and 545 depict situations where the adjusted boundary includes geographical space that was not included in the first, unadjusted boundary. Alternatively, the rest of the examples depict situations where the adjusted boundary is within the first, unadjusted boundary. Clearly, in some examples (e.g. 505 and 530), boundary adjustment may be uniform. In other words, the overall shape of the boundary is the same in going from unadjusted to adjusted boundary, but the dimensions are smaller (or in some examples that are not depicted, could be larger). Alternatively, the remaining examples depict non-uniform adjustments from the first boundary to the second, adjusted boundary. Such non-uniform adjustments may be particularly advantageous in urban areas which have differing flows of traffic at different times, etc. By relying on V2V and V2I communications for adjusting such boundaries, the boundaries may be adjusted in an optimal fashion for instructing vehicles to be controlled with regard to, for example, fuel economy targets and/or emissions targets. It may be understood that the examples discussed with regard to FIG. 5 include boundaries that define physical square numbers of meters.

Turning to FIG. 6, a high-level example method 600 is shown, depicting how V2V and/or V2I communications may be used to adjust predetermined boundaries for controlling vehicle operating conditions within said boundaries.

Method 600 will be described with reference to the systems described herein and shown in FIGS. 1-4, though it should be understood that similar methods may be applied to other systems without departing from the scope of this disclosure. Method 600 may be carried out by a controller, such as controller 152 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the vehicle, such as the sensors described above with reference to FIGS. 1-2.

Method 600 begins at 605 and includes sending/receiving information related to setting geographical coordinates of an adjustable boundary as discussed herein, via one or more of V2V and V2I communications (e.g. via communications system 54). For example, a vehicle may rely on information collected via the navigation system (e.g. 52), inertial sensor (e.g. 90) data, navigational sensor (e.g. 91) data, etc., for inferring current conditions related to traffic, weather, density of pedestrians, density of vehicles, density of buildings, etc. The vehicle may communicate such information to other vehicles, and may receive similar information from other nearby vehicles.

Proceeding to 610, method 600 may include processing data acquired via the vehicle, including data acquired specifically via the vehicle sensor systems discussed, as well as data acquired from other vehicles via V2V and V2I communications. Processing the data may be conducted via the controller, and may be in conjunction with data retrieved from the navigation system including but not limited to geographical maps associated with a geographical region corresponding to the current boundary. Specifically, a region defined by the current boundary may be divided into any number of smaller sub-sections, and based on the processed data it may be determined as to whether particular sub-sections meet predetermined conditions for remaining included within the current boundary, or meet predetermined conditions for being excluded from within the current boundary. The more sub-sections that the region defined by the current boundary is divided into, the higher a resolution whereby the current boundary may be adjusted.

Accordingly, proceeding to 615, method 600 may include indicating whether conditions are indicated to be met for adjusting the current boundary. For example, it may be determined that a particular vehicle density for particular sub-sections of the area defined by the current boundary is lower than a threshold vehicle density, and thus such particular sub-sections of the area may be excluded from being within the boundary. More broadly speaking, the controller may assess a number of parameters (e.g. vehicle density, current traffic information, weather conditions, presence or absence of construction, pedestrian density, etc.) and may feed such parameters into an algorithm that outputs a boundary adjustment parameter. The boundary adjustment parameter may be compared to a boundary adjustment threshold. In one example, if the boundary adjustment parameter exceeds the boundary adjustment threshold, particular sub-sections may be excluded from the current boundary region. In another example, if the boundary adjustment parameter does not exceed the boundary adjustment threshold, then particular sub-sections may be maintained within the current boundary region. In other examples, if the boundary adjustment parameter does not exceed the boundary adjustment threshold, then particular sub-sections may be excluded from the current boundary region. In yet other examples, if the boundary adjustment parameter exceeds the boundary adjustment threshold, then particular sub-sections may be maintained within the current boundary region. Such examples are meant to be illustrative in nature. While not explicitly discussed, in some examples such boundary adjustment parameters and boundary adjustment thresholds may be relied upon for increasing an area defined by the current boundary, to include particular areas not currently included within the boundary. In some examples, the boundary adjustment threshold(s) are a function of desired emissions, fuel economy, vehicle speed, etc. The boundary adjustment thresholds may be generated at the controller and may include information retrieved wirelessly via the controller of the vehicle, for example information pertaining to emissions targets, fuel economy targets, target mode of operation for vehicles, etc.

If, at 615, conditions are not indicated to be met for adjusting the current boundary, method 600 may proceed to 620 and may include maintaining the current boundary without adjusting the current boundary. In such an example, the vehicle may continue to send and receive information related to setting the adjustable boundary and processing such information in the manner described above.

Alternatively, returning to 615, if conditions are met for adjusting the current boundary, method 600 may proceed to 625, where the current boundary is adjusted and stored at the controller. The dimensions of the adjusted boundary may be communicated to other vehicles both within the adjusted boundary and outside of the adjusted boundary, via V2V and/or V2I communications.

Proceeding to 630, method 600 may include storing data pertaining to the adjustment of the current boundary (e.g. data related to time of day that the boundary was adjusted, day of week, weather conditions, traffic conditions, presence or absence of construction, etc.). In some examples, such data may be transmitted to a server via wireless communication. Such data may be processed in order to learn particular conditions which led to the adjustment of the boundary, which may then be communicated to one or more vehicles. Such processing may comprise an analytics module (not shown) which may rely on machine learning algorithms for learning of particular conditions that led to the adjustment of the boundary. Method 600 may then end.

Said another way, the method of FIG. 6 may enable a method for vehicles comprising adjusting a transition region with respect to physical land landmarks based on information of a plurality of vehicles operating in and/or around an interior of the transition region. In other words, the transition region may comprise the adjustable boundary. The physical land landmarks may in one example comprise a plurality of buildings of a density greater than a building density threshold. The physical land landmarks may in other examples may additionally or alternatively comprise one or more of roads, rivers, bridges, convention centers, stadiums, restaurants, etc. For example, in adjusting the transition region, particular physical land landmarks may be either excluded from being within an area defined by the transition region, or may be included within the area defined by the transition region. Information of the plurality of vehicles operating in and/or around the interior of the transition region may include but is not limited to vehicle density, pedestrian density, presence or absence of construction which may impact traffic flow, information retrieved from a smart traffic system, current weather conditions which may impact traffic flow, time of day, time of year, presence or absence of events (e.g. professional sports, concerts, etc.) which may impact traffic flow, etc. Such information may be obtained via V2V and/or V2I communications involving the plurality of vehicles.

The transition region may define, for example, allowable vehicle parameters. In other words, the transition region may define target vehicle parameters for vehicles operating within the area defined by the transition region. Examples include but are not limited to emissions, vehicle speed, powerplant mode of operation (BEV, HEV, engine, etc.). For example, an emissions requirement may be more stringent (e.g. lower target emissions level) for vehicles operating within the area defined by the transition region, as compared to vehicles operating outside the transition region. In terms of vehicle speed, in one example a maximum vehicle speed may be lower for vehicles operating within the area defined by the transition region, as compared to vehicles operating outside the transition region. In some examples, engine operation may be excluded from use when vehicles are operating within the transition region. In other examples, engine operation may be limited to a particular amount of time while the vehicle is operating within the transition region. Similar examples apply to operation of the vehicle in other powerplant modes.

Adjustment of the transition region may include increasing or decreasing an enclosed physical number of square meters within the transition region. For example, a transition region may define an area of 200 square meters. Upon adjusting the transition region, the transition region may define an area of 150 square meters. Alternatively, in other examples the physical number of square meters may be maintained the same upon adjusting the transition region, but where adjusting the transition region includes changing a shape of the transition region. Another example of adjusting the transition region may include maintaining a number of enclosed vehicles within the area defined by the transition region, while changing a length of a perimeter that defines the transition region and/or a number of square meters within the perimeter.

Turning to FIG. 7, a high-level example method 700 is shown, depicting how vehicle operating parameters (e.g. control mapping of particular parameters) may be controlled as a function of whether the vehicle is operating outside of an adjustable boundary or within the adjustable boundary.

Method 700 will be described with reference to the systems described herein and shown in FIGS. 1-4, though it should be understood that similar methods may be applied to other systems without departing from the scope of this disclosure. Method 700 may be carried out by a controller, such as controller 152 in FIG. 2, and may be stored at the controller as executable instructions in non-transitory memory. Instructions for carrying out method 700 and the rest of the methods included herein may be executed by the controller based on instructions stored on a memory of the controller and in conjunction with signals received from sensors of the vehicle, such as the sensors described above with reference to FIGS. 1-2. The controller may employ vehicle actuators such as throttle (e.g. 116), EGR valve (e.g. 164), fuel injector(s) (e.g. 136), turbine (e.g. 172), etc., according to the methods depicted herein.

Method 700 begins at 705, and may include controlling vehicle operating parameters as a function of a first control mapping (e.g. first map or set of maps stored at the controller) when it is determined that the vehicle is operating outside of a particular adjustable boundary or geo-fence (also referred to herein as a transition region), as discussed herein. Details of what may constitute a first control mapping are discussed in further detail below with regard to FIG. 8 and discussion therein.

Discussed herein, the adjustable boundary may be at least partially defined by a density of buildings and/or density of vehicles. For example, a density above a first threshold building density and/or a density of vehicles about a second threshold vehicle density, may define an area within the adjustable boundary. As discussed above, such determinations as to the boundary of such an area may be determined via V2V/V2I communications, and may be at least partially pre-set based on geographical constraints including but not limited to building density, etc.

Proceeding to 710, method 700 may include indicating whether the vehicle has entered into a region defined by the adjustable boundary. Such an indication may be provided via one or more of V2V communications, V2I communications, from information retrieved from the navigation system, etc. If, at 710, the vehicle has not entered into the region defined by the adjustable boundary, then method 700 may return to 705, where the vehicle operating parameters are controlled as a function of the first control mapping.

If, at 710, it is indicated that the vehicle has entered into the region defined by the adjustable boundary, method 700 may proceed to 715. At 715, method 700 includes switching control of vehicle operating parameters from the first control mapping to a second control mapping, where the second control mapping includes controlling the vehicle operating parameters based on particular targets (e.g. fuel economy targets, emissions targets, etc.) as defined by the adjustable boundary. Details of what may constitute a second control mapping are discussed in further detail below with regard to FIG. 8 and discussion therein.

Proceeding to 720, method 700 may include determining as to whether the adjustable boundary has been adjusted to exclude the vehicle from the adjustable boundary. If not, method 700 may return to 715, where the vehicle operating parameters may continue to be controlled as a function of the second mapping. Alternatively, if at 720 it is determined that the adjustable boundary has been adjusted such that the vehicle is now excluded from the boundary, then method 700 may proceed to 725, where the vehicle operating parameters are again controlled as a function of the first mapping.

Turning now to FIG. 8, example illustration 800 depicts an example of a first control mapping and a second control mapping, for use in accordance with the method of FIG. 7, discussed above. Specifically, example illustration 800 depicts how, in switching from the first control mapping to the second control mapping, an acceleration of the vehicle may vary less for a given change in driver input (e.g. input provided via acceleration control 10*a*). In other words, when the vehicle is controlled in accordance with the second control mapping, vehicle acceleration varies less for a given change in driver input as compared to when the vehicle is controlled in accordance with the first control mapping.

Specifically, example illustration 800 depicts accelerator input on an X axis and throttle position on the Y axis. More specifically, greater acceleration is requested in the direction of arrow 815, and greater amounts of throttle opening is depicted in the direction of arrow 820. A first control mapping 805 depicts an accelerator control mapping for when the vehicle is operating outside of an area defined by an adjustable boundary (e.g. urban area defined by an adjustable boundary), and second control mapping 810 depicts an accelerator control mapping for when the vehicle is operating within or inside of the area defined by the adjustable boundary. As illustrated, for the second control mapping 810, an amount in which the throttle (e.g. 116) is opened in response to a particular accelerator input, is reduced as compared to the first control mapping 805. By reducing the extent to which the throttle is opened in response to a given accelerator input (in other words, by controlling the vehicle in accordance with the second control mapping), fuel economy and emissions may be improved as compared to when the vehicle is controlled in accordance with the first control mapping, when the vehicle is operating inside of the adjustable boundary.

While not explicitly illustrated, in other examples switching from the first control mapping to the second control mapping may additionally or alternatively involve changing a positioning of the EGR valve (e.g. 164). In one example, the EGR valve may be opened to a greater extent when the vehicle is being controlled in accordance with the first control mapping, as compared to when the vehicle is being controlled according to the second control mapping. However, in other examples, the EGR valve may be opened to a lesser extent when the vehicle is being controlled in the first control mapping, as compared to when the vehicle is being controlled according to the second control mapping. In some examples, extent of opening of the EGR valve may be a function of accelerator pedal position, controlled in accordance with either the first control mapping or the second control mapping. As one example, the EGR valve may be controlled in order to control NOx emissions to a first target when operating outside of the adjustable boundary, and controlled in order to control NOx emissions to a second target when operating inside the adjustable boundary. As one example, the second target may be lower than the first target.

In another example not explicitly depicted, switching from the first control mapping to the second control mapping may additionally or alternatively involve differentially controlling operation of the turbocharger (e.g. 170). As discussed above, in some examples the turbocharger may comprise a turbine bypass, which may allow for control over an amount or proportion of exhaust gases that bypass the turbine of the turbocharger. Such a turbine bypass may be differentially utilized in the first control mapping as compared to the second control mapping. For example, a greater proportional amount of exhaust gases may be controlled to bypass the turbine when the vehicle is being controlled in the second control mapping, as compared to the first control mapping, for a given torque request (e.g. accelerator pedal position). However, in other examples a greater amount of exhaust gases may be controlled to bypass the turbine when operating in the first control mapping, as compared to the second control mapping, without departing from the scope of this disclosure. In another example where the turbine comprises a variable geometry turbine comprising a plurality of inlet vanes, angles of which are adjustable, control of an angle of the inlet vanes may be differentially controlled in the first control mapping as compared to the second control mapping. In one example, the first control mapping may include controlling the inlet vanes such that a greater pressure ratio is generated across the turbine for given accelerator pedal input, and where a lesser pressure ratio is generated across the turbine for given torque request (e.g. accelerator pedal input) in the second control mapping. However, in other examples a greater pressure ratio may be controlled across the turbine when operating in the second control mapping, as compared to when operating in the first control mapping, without departing from the scope of this disclosure.

In another additional or alternative example, the first control mapping may differ from the second control mapping in terms of a torque response of the engine (e.g. 120). For example, a torque provided by the engine may vary less as a rotational speed of the engine crank shaft (e.g. 138) varies, when the vehicle is being controlled in accordance with the second control mapping, as compared to when the vehicle is being controlled in accordance with the first control mapping (or vice versa). For example, the second control mapping may involve varying timing with which fuel is injected into one or more engine cylinders (e.g. 124) relative to a top dead center position of the cylinder's piston (e.g. 128), as compared to the first control mapping.

In yet another additional or alternative example, a torque and/or power response of the engine may be differentially controlled in the first control mapping as compared to the second control mapping (e.g. via controlling operation of the turbocharger and/or EGR system) in a manner whereby a change in torque and/or power response of the engine is reduced for changes in engine speed for the second control mapping as compared to the first control mapping.

Furthermore, while not explicitly illustrated, switching from the first control mapping to the second control mapping (or vice versa) may involve differentially controlling a motor/generator (e.g. 293). For example, the motor/generator may be used to assist in propelling the vehicle as a function of accelerator pedal position to a greater extent when operating inside the adjustable boundary (e.g. when the vehicle is controlled according to the second control mapping), as compared to outside the adjustable boundary (e.g. when the vehicle is controlled according to the first control mapping).

Discussed herein, by adjusting the control mapping in the manner described above, a rate of acceleration of the vehicle may be reduced for a given driver input when the vehicle is operating inside the area defined by the adjustable boundary, as compared to when the vehicle is operating outside of the adjustable boundary. In such an example, reducing the sensitivity of the acceleration control (e.g. 10*a*) may assist the vehicle operator or driver in accelerating smoothly when driving inside the adjustable boundary, and may assist in avoiding situations in which the driver brakes sharply. Such adjustments may improve fuel economy and/or reduce emissions, and may improve driver satisfaction.

More specifically in terms of emissions, the second control mapping may additionally or alternatively involve varying a timing in which fuel is injected into one or more engine cylinders relative to the top dead center position of the cylinder's piston, to reduce an amount of pollutant substances produced during combustion, as compared to the first control mapping. Additionally or alternatively, a position of the EGR valve (e.g. 164) and/or operation of the turbocharger may be adjusted (e.g. to control an amount, for example increase, of recirculated exhaust gases) to reduce the amount of pollutant substances being produced.

Additionally or alternatively, the emissions of the vehicle may be controlled (e.g. reduced) by controlling the operation of one or more of the exhaust gas after-treatment devices, such as the catalytic oxidation device and/or the catalytic reduction device. For example, the operation of the catalytic reduction device may be controlled by adjusting the amount of reductant being introduced. In the above example, it may be understood that the second control mapping involves the reduction of emissions as compared to the first control mapping. However, in other examples, emissions may be reduced for the first control mapping as compared to the second control mapping.

In some additional or alternative examples, controlling the vehicle in accordance with the first control mapping as compared to the second control mapping may involve performing a regeneration of the after-treatment device. As discussed above, the performance of the device may be increased after the device has been regenerated. Thus, in one example, the second control mapping may involve regenerating the exhaust after-treatment device sooner than when the vehicle is being controlled in accordance with the first control mapping. In other words, when controlled in accordance with the second control mapping, the regeneration may be performed before the exhaust gas after-treatment device reaches capacity (e.g. before it would otherwise have been regenerated under circumstances where the vehicle is being controlled in accordance with the first control mapping).

In some examples, it may be undesirable for the exhaust gas after-treatment device to be regenerated while the vehicle is operating within the adjustable boundary, or in other words, when the vehicle is being controlled in accordance with the second control mapping. Hence, in some examples the method of FIG. 7, while not explicitly illustrated, may involve a step in which it is predicted as to whether the vehicle is expected to enter into an area defined by the adjustable boundary (e.g. based on GPS location of the vehicle, direction in which the vehicle is headed, learned routes commonly traveled by the vehicle, V2V communications between the vehicle and other nearby vehicles, V2I communications, etc.). In such an example where it is predicted or inferred that the vehicle is about to enter into the area defined by the adjustable boundary, the exhaust after-treatment device may be pre-emptively regenerated (e.g. before crossing into the area defined by the adjustable boundary).

In some examples, an emissions requirement within the adjustable boundary may differ from another emissions requirement outside of the area defined by the adjustable boundary. As one example, the emissions requirement within the area defined by the adjustable boundary may be more restrictive (e.g. may require less emissions) in terms of one or more pollutant substances than the emissions requirement outside the area defined by the adjustable boundary.

The vehicle controller (e.g. 150) may be configured to receive such emissions requirements corresponding to a particular area defined by an adjustable boundary upon entering into such an area, or when it is predicted or inferred that the vehicle will soon (e.g. within 5 minutes, within 1 minute, within 30 seconds, etc.) cross into the area defined by the adjustable boundary. Such receipt may be via the communications system (e.g. 54), via communication between the controller and the internet, via GPS, etc.

If the emissions requirement within an area defined by the adjustable boundary is different from the emissions requirement outside of the urban area, the controller may control operation of the vehicle in order to conform to the emissions requirement. For example, the controller may control operation of the EGR system, the turbocharger, and/or one or more of the exhaust gas after-treatment devices in order to conform to the emissions requirement. Such controlling may involve switching from the first control mapping to the second control mapping, as discussed above, in order to conform to the emissions requirement while operating within the area defined by the adjustable boundary.

In still other additional or alternative examples, engine efficiency may be differentially controlled when the vehicle is controlled according to the second mapping as compared to the first control mapping. More specifically, engine efficiency may be improved in accordance with the second control mapping by varying a timing in which fuel is injected into one or more engine cylinders relative to the top dead center position of the particular cylinder's piston. Additionally or alternatively, position of the EGR valve and/or operation of the turbocharger may be adjusted in order to improve engine efficiency in accordance with the second control mapping as compared to the first control mapping.

Thus, discussed herein a method of operating a vehicle may comprise determining that the vehicle has entered an urban area; and adjusting a control mapping of an acceleration control of the vehicle, such that an acceleration of the vehicle varies less for a given change in driver input, in response to the vehicle entering the urban area. As one example, the step of determining that the vehicle has entered an urban area may comprise determining whether a location of the vehicle is within one or more geo-fenced areas indicated as urban areas. For example, the step of determining that the vehicle has entered an urban area may comprise receiving one or more communications via a vehicle to vehicle or vehicle to infrastructure communication system. Such a method may further comprise adjusting an engine mapping of the vehicle in order to reduce a torque response of the engine, in response to the vehicle entering the urban area. Such a method may further comprise adjusting an operation of a turbocharger and/or exhaust gas recirculation system of the vehicle in order to reduce a torque response of the vehicle's engine, in response to the vehicle entering the urban area. Such a method may further comprise controlling the operation of the vehicle in order to improve an efficiency of an engine of the vehicle, in response to the vehicle entering the urban area. For example controlling operation of the vehicle may comprise adjusting an engine mapping of the vehicle in order to improve the efficiency of the engine. In another example, controlling the operation of the vehicle may comprise controlling the operation of a turbocharger and/or exhaust gas recirculation system of the vehicle in order to improve efficiency of the engine. In some examples, the method discussed above may further comprise controlling the operation of the vehicle in order to reduce an emission of the vehicle, in response to the vehicle entering the urban area. In such an example, controlling the operation of the vehicle may comprise adjusting an engine mapping of the vehicle in order to reduce the emission of the vehicle. As another example, controlling the operation of the vehicle may comprise controlling the operation of a turbocharger and/or exhaust gas recirculation system of the vehicle in order to reduce the emission of the vehicle. As another example, controlling the operation of the vehicle may comprises controlling the operation of one or more exhaust after-treatment device of the vehicle. In some examples, such a method may include predicting whether the vehicle is expected to enter an urban area, and regenerating one or more exhaust after-treatment devices of the vehicle prior to entering the urban area. In some examples, the method may comprise receiving an emissions requirement relevant to the urban area, and may further include controlling the operation of the vehicle according to the emissions requirement.

A control system for a vehicle may comprise an acceleration control for controlling the acceleration of the vehicle according to a driver input and a sensor configured to determined when a vehicle enters an urban area, wherein the control system is configured to adjust a control mapping of the acceleration control, such that the acceleration of the vehicle varies less for a given change in driver input, in response to the sensor determining that the vehicle has entered an urban area. Specifically, the control system may be configured to perform the method discussed above.

In this way, one or more vehicle operating parameters may be differentially controlled when a vehicle is determined to be operating inside or within an adjustable boundary, as compared to when the vehicle is determined to be operating outside of the adjustable boundary. In this way, one or more of fuel economy target(s), emissions target(s), etc., may be met when the vehicle is operating within the adjustable boundary, as compared to when the vehicle is operating outside of the adjustable boundary.

The technical effect is to recognize that via the use of V2V and/or V2I communications, a boundary for a particular geo-fence may be adjustable in real-time, so as to reflect current road conditions including but not limited to current density of vehicles, current density of pedestrians, presence or absence of construction which may disrupt traffic flow, weather conditions which may impact traffic flow, etc. By adjusting the boundary in real-time, fuel economy, emissions, and customer satisfaction may be improved for vehicles that are differentially controlled depending on whether the vehicle is operating within a particular adjustable boundary, or outside of such an adjustable boundary.

The systems and methods discussed herein may enable one or more systems and one or more methods. In one example, a method comprises propelling the vehicle via an engine, determining that the vehicle has entered into an area defined by an adjustable boundary and adjusting a control mapping of an acceleration control of the vehicle in response to the determining, where the determining further comprises the vehicle receiving one or more communications via a vehicle to vehicle or a vehicle to infrastructure communications system. In a first example of the method, the method further includes wherein adjusting the control mapping of the acceleration control further comprises: adjusting the control mapping of the acceleration control so that an acceleration of the vehicle varies less for a given change in driver input in response to the vehicle entering into the area defined by the adjustable boundary. A second example of the method optionally includes the first example, and further includes wherein the area defined by the adjustable boundary comprises an urban area. A third example of the method optionally includes any one or more or each of the first and second examples, and further comprises reducing a torque response of the engine in response to the vehicle entering into the area defined by the adjustable boundary. A fourth example of the method optionally includes any one or more or each of the first through third examples, and further includes wherein reducing the torque response of the engine further comprises adjusting an operation of a turbocharger of the vehicle. A fifth example of the method optionally includes any one or more or each of the first through fourth examples, and further includes wherein reducing the torque response of the engine further comprises adjusting an operation of an exhaust gas recirculation system of the vehicle. A sixth example of the method optionally includes any one or more or each of the first through fifth examples, and further comprises controlling operation of the vehicle in order to improve an efficiency of the engine of the vehicle, in response to the vehicle entering into the area defined by the adjustable boundary. A seventh example of the method optionally includes any one or more or each of the first through sixth examples, and further comprises controlling operation of the vehicle to reduce an emission of the vehicle, in response to the vehicle entering into the area defined by the adjustable boundary. An eighth example of the method optionally includes any one or more or each of the first through seventh examples, and further includes wherein controlling operation of the vehicle to reduce the emission of the vehicle further comprises controlling operation of a turbocharger to reduce the emission of the vehicle. A ninth example of the method optionally includes any one or more or each of the first through eighth examples, and further includes wherein controlling operation of the vehicle to reduce the emission of the vehicle further comprises controlling operation of an exhaust gas recirculation system of the vehicle to reduce the emission of the vehicle. A tenth example of the method optionally includes any one or more or each of the first through ninth examples, and further includes wherein controlling the operation of the vehicle to reduce the emission of the vehicle further comprises controlling the operation of an exhaust after-treatment device of the vehicle. An eleventh example of the method optionally includes any one or more or each of the first through tenth examples, and further comprises predicting the vehicle will enter into the area defined by the adjustable boundary; and controlling the operation of the exhaust after-treatment device in response to the predicting. A twelfth example of the method optionally includes any one or more or each of the first through eleventh examples, and further comprises receiving an emissions requirement relevant to the adjustable boundary; and controlling operation of the vehicle according to the emissions requirement.

Another example of a method comprises controlling the vehicle based on a first control mapping for controlling one or more vehicle operating parameters when it is determined that the vehicle is operating outside an area defined by an adjustable geo-fence; controlling the vehicle based on a second control mapping for controlling the one or more vehicle operating parameters when it is determined that the vehicle is operating inside of the area defined by the adjustable geo-fence; and in response to a boundary of the adjustable geo-fence being adjusted to exclude the vehicle from the area defined by the adjustable geo-fence, controlling the vehicle based on the first control mapping. In a first example of the method, the method further includes wherein the boundary of the adjustable geo-fence is adjusted based on a vehicle communications system that includes vehicle to vehicle and vehicle to infrastructure communications. A second example of the method optionally includes the first example, and further includes wherein the boundary is adjusted as a function of one or more of traffic conditions and weather conditions. A third example of the method optionally includes any one or more or each of the first through second examples, and further includes wherein controlling the vehicle based on the second control mapping involves adjusting an engine mapping of the vehicle so that a rate of acceleration of the vehicle for a given acceleration control input is reduced, as compared to the first control mapping. A fourth example of the method optionally includes any one or more or each of the first through third examples, and further includes wherein controlling the vehicle based on the second control mapping involves reducing an emission of the vehicle as compared to controlling the vehicle based on the first control mapping.

An example of a system for a vehicle comprises an engine; a communications system; and a controller with computer readable instructions stored on non-transitory memory that when executed, cause the controller to: send a request via the communications system requesting information as to a boundary of an adjustable geo-fence; receive the request related to the boundary of the adjustable geo-fence; determine if the vehicle is operating within the boundary of the adjustable geo-fence; and control one or more vehicle operating parameters based on whether the vehicle is operating within the boundary of the adjustable geo-fence or outside of the adjustable geo-fence. In a first example of the system, the system further includes wherein the controller stores further instructions to control the one or more vehicle operating parameters based on a first control mapping when the vehicle is operating outside of the adjustable geo-fence; and control the one or more vehicle operating parameters based on a second control mapping when the vehicle is operating inside of the adjustable geo-fence, where controlling the one or more vehicle operating parameters based on the second control mapping involves one or more of reducing an acceleration rate of the vehicle for a given acceleration control input and reducing an emission of the vehicle, as compared to controlling the one or more vehicle operating parameters based on the first control mapping.

In another representation, a method comprises via a communication system sending a request for information pertaining to an adjustable geo-fence, retrieving information related to the request via the communication system; and adjusting a boundary of the geo-fence based on the retrieved information. As one example, the communication system includes one or more of V2V and/or V2I communications. In some examples, the communication system is communicably coupled via one or more vehicles and/or infrastructures to a smart traffic system. Adjusting of the boundary may comprise uniformly adjusting the boundary, or non-uniformly adjusting the boundary. Adjusting the boundary may involve decreasing an area of the boundary, or in other examples may involve increasing the area of the boundary. Adjusting of the boundary may be a function of one or more of vehicle density, pedestrian density, weather conditions, presence or absence of construction, etc., where such information is communicated to the vehicle via the V2V and/or V2I communications. The method may comprise controlling one or more vehicle operating parameters according to a first control mapping when the vehicle is operating outside of the boundary, and controlling the one or more vehicle operating parameters according to a second control mapping when the vehicle is operating inside of the boundary. By allowing for the boundary to be adjustable and determined via V2V and/or V2I communications, the boundary may be more reflective of current traffic conditions and thus may allow for a greater adherence to desired fuel economy and emissions criteria.

In still another representation, a method for controlling vehicles, comprising: adjusting a transition region with respect to physical land landmarks based on information of a plurality of vehicles operating in and/or around an interior of the transition region. The transition region may define allowable vehicle parameters, such as emissions, speed, powerplant mode (BEV, HEV, Engine, etc.). The adjustment includes increasing or decreasing an enclosed physical number of square meters within the region. In another example, the adjustment includes maintaining the enclosed physical number of square meters while changing a shape of the region. In another example, the adjustment includes maintaining a number of enclosed vehicles within the region but changing a length of a perimeter and/or number of square meters within the perimeter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
propelling the vehicle via an engine, determining that the vehicle has entered into an area defined by an adjustable boundary and adjusting a control mapping of an acceleration control of the vehicle in response to determining the vehicle has entered into the area defined by the adjustable boundary,
where adjusting the control mapping of the acceleration control in response to determining the vehicle has entered into the area defined by the adjustable boundary includes adjusting a rate of acceleration of the vehicle for a given acceleration control input,
where the determining further comprises the vehicle receiving one or more communications via a vehicle to vehicle or a vehicle to infrastructure communications system, and where the adjustable boundary is adjusted responsive to a comparison between a boundary adjustment parameter and a boundary adjustment threshold.

2. The method of claim 1, wherein adjusting the control mapping of the acceleration control further comprises:
adjusting the control mapping of the acceleration control so that the rate of acceleration of the vehicle is lower for a given change in driver input in response to the vehicle entering into the area defined by the adjustable boundary.

3. The method of claim 1, wherein the area defined by the adjustable boundary comprises an urban area, and the boundary adjustment parameter includes vehicle density, current traffic information, weather condition, presence of construction, and pedestrian density.

4. The method of claim 1, further comprising reducing a torque response of the engine in response to the vehicle entering into the area defined by the adjustable boundary.

5. The method of claim 4, wherein reducing the torque response of the engine further comprises adjusting an operation of a turbocharger of the vehicle.

6. The method of claim 4, wherein reducing the torque response of the engine further comprises adjusting an operation of an exhaust gas recirculation system of the vehicle.

7. The method of claim 1, further comprising controlling operation of the vehicle in order to improve an efficiency of the engine of the vehicle, in response to the vehicle entering into the area defined by the adjustable boundary.

8. The method of claim 1, further comprising controlling operation of the vehicle to reduce an emission of the vehicle, in response to the vehicle entering into the area defined by the adjustable boundary.

9. The method of claim 8, wherein controlling operation of the vehicle to reduce the emission of the vehicle further comprises controlling operation of a turbocharger to reduce the emission of the vehicle.

10. The method of claim 8, wherein controlling operation of the vehicle to reduce the emission of the vehicle further comprises controlling operation of an exhaust gas recirculation system of the vehicle to reduce the emission of the vehicle.

11. The method of claim 8, wherein controlling the operation of the vehicle to reduce the emission of the vehicle further comprises controlling the operation of an exhaust after-treatment device of the vehicle.

12. The method of claim 11, further comprising predicting the vehicle will enter into the area defined by the adjustable boundary; and
controlling the operation of the exhaust after-treatment device in response to the predicting.

13. The method of claim 1, further comprising:
receiving an emissions requirement relevant to the adjustable boundary; and
controlling operation of the vehicle according to the emissions requirement.

14. A method for a vehicle comprising:
controlling the vehicle based on a first control mapping for controlling one or more vehicle operating parameters when it is determined that the vehicle is operating outside an area defined by an adjustable geo-fence;
controlling the vehicle based on a second control mapping for controlling the one or more vehicle operating parameters when it is determined that the vehicle is operating inside of the area defined by the adjustable geo-fence,
where controlling the vehicle based on the second control mapping includes adjusting a rate of acceleration of the vehicle for a given acceleration control input to be different as compared to the first control mapping, and
where determining the vehicle is operating inside the area defined by the adjustable geo-fence includes the vehicle receiving one or more communications via a vehicle to vehicle or a vehicle to infrastructure communications system; and
in response to a boundary of the adjustable geo-fence being adjusted to exclude the vehicle from the area defined by the adjustable geo-fence, controlling the vehicle based on the first control mapping,
where the boundary of the adjustable geo-fence is adjusted based on a comparison between a boundary adjustment parameter and a boundary adjustment threshold.

15. The method of claim 14, wherein the boundary of the adjustable geo-fence is adjusted in real-time based on a vehicle communications system that includes the vehicle to vehicle and the vehicle to infrastructure communications system.

16. The method of claim 14, wherein the boundary is adjusted as a function of one or more of traffic conditions and weather conditions.

17. The method of claim 14, wherein controlling the vehicle based on the second control mapping involves adjusting an engine mapping of the vehicle so that the rate of acceleration of the vehicle for the given acceleration control input is reduced, as compared to the first control mapping.

18. The method of claim 14, wherein controlling the vehicle based on the second control mapping involves reducing an emission of the vehicle as compared to controlling the vehicle based on the first control mapping.

19. A system for a vehicle, comprising:
an engine;
a vehicle communications system; and
a controller with computer readable instructions stored on non-transitory memory that when executed, cause the controller to:
send a request via the communications system requesting information as to a boundary of an adjustable geo-fence;
receive the request related to the boundary of the adjustable geo-fence;
determine if the vehicle is operating within the boundary of the adjustable geo-fence based on receiving one or more communications via a vehicle to vehicle or a vehicle to infrastructure communications system of the vehicle communications system; and
control one or more vehicle operating parameters based on whether the vehicle is operating within the boundary of the adjustable geo-fence or outside of the adjustable geo-fence, where controlling the one or more vehicle operating parameters includes adjusting a rate of acceleration of the vehicle for a given acceleration control input,
where the boundary of the adjustable geo-fence is adjusted responsive to a comparison between a boundary adjustment parameter and a boundary adjustment threshold.

20. The system of claim 19, wherein the controller stores further instructions to control the one or more vehicle operating parameters based on a first control mapping when the vehicle is operating outside of the adjustable geo-fence; and control the one or more vehicle operating parameters based on a second control mapping when the vehicle is operating inside of the adjustable geo-fence, where controlling the one or more vehicle operating parameters based on the second control mapping involves one or more of reducing an acceleration rate of the vehicle for the given acceleration control input and reducing an emission of the vehicle, as compared to controlling the one or more vehicle operating parameters based on the first control mapping for the given acceleration control input.

\* \* \* \* \*